(12) United States Patent
Yaguchi

(10) Patent No.: US 11,457,148 B2
(45) Date of Patent: Sep. 27, 2022

(54) IMAGE PROCESSING APPARATUS, IMAGING APPARATUS, AND CONTROL METHOD

(71) Applicant: CANON KABUSHIKI KAISHA, Tokyo (JP)

(72) Inventor: Hiroyuki Yaguchi, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 17/021,059

(22) Filed: Sep. 15, 2020

(65) Prior Publication Data

US 2021/0084226 A1 Mar. 18, 2021

(30) Foreign Application Priority Data

Sep. 18, 2019 (JP) .............................. JP2019-169625

(51) Int. Cl.
- *H04N 5/232* (2006.01)
- *G06F 3/01* (2006.01)

(52) U.S. Cl.
CPC ......... *H04N 5/23287* (2013.01); *G06F 3/013* (2013.01); *H04N 5/23209* (2013.01); *H04N 5/23254* (2013.01); *H04N 5/23261* (2013.01)

(58) Field of Classification Search
CPC .......... H04N 5/23287; H04N 5/23261; H04N 5/2328; H04N 5/23258; H04N 5/232127; H04N 5/23212; G06F 3/13
See application file for complete search history.

(56) References Cited

U.S. PATENT DOCUMENTS

| | | | | |
|---|---|---|---|---|
| 5,649,239 | A * | 7/1997 | Tamekuni | G02B 7/28 396/104 |
| 8,611,733 | B2 * | 12/2013 | Ohishi | H04N 5/23248 396/55 |
| 8,768,156 | B2 * | 7/2014 | Ohishi | H04N 5/23287 396/52 |
| 9,900,513 | B2 * | 2/2018 | Imada | H04N 5/23258 |
| 10,200,601 | B2 * | 2/2019 | Mukunashi | H04N 5/23287 |
| 10,321,058 | B2 * | 6/2019 | Miyazawa | H04N 5/2328 |
| 10,389,942 | B2 * | 8/2019 | Miyazawa | H04N 5/23267 |
| 10,551,634 | B2 * | 2/2020 | Gyotoku | H04N 5/23261 |
| 2007/0110418 | A1 * | 5/2007 | Imada | G03B 5/04 396/55 |
| 2011/0304747 | A1 * | 12/2011 | Nakata | H04N 5/23245 348/E5.031 |

FOREIGN PATENT DOCUMENTS

| | | | | |
|---|---|---|---|---|
| JP | 06-294925 | A | 10/1994 | |
| JP | 2956543 | B | 10/1999 | |
| JP | 2010085440 | A * | 4/2010 | |
| JP | 2012173709 | A * | 9/2012 | ............... G02B 7/28 |
| JP | 2015034997 | A * | 2/2015 | |
| JP | 2016136242 | A * | 7/2016 | ......... H04N 5/23258 |
| JP | 2017134185 | A * | 8/2017 | .......... G02B 27/646 |
| JP | 2018025611 | A * | 2/2018 | |

\* cited by examiner

*Primary Examiner* — John Villecco

(74) *Attorney, Agent, or Firm* — Cowan, Liebowitz & Latman, P.C.

(57) ABSTRACT

A digital camera that corrects an image blur of a captured image by driving a shift lens group is provided. The digital camera determines a specified region of the captured image, and when a panning shot will be performed, the digital camera drives the shift lens group based on a movement of the specified region to execute control to correct an image blur for the specified region, and subsequently executes focus control for focusing on an object.

15 Claims, 23 Drawing Sheets

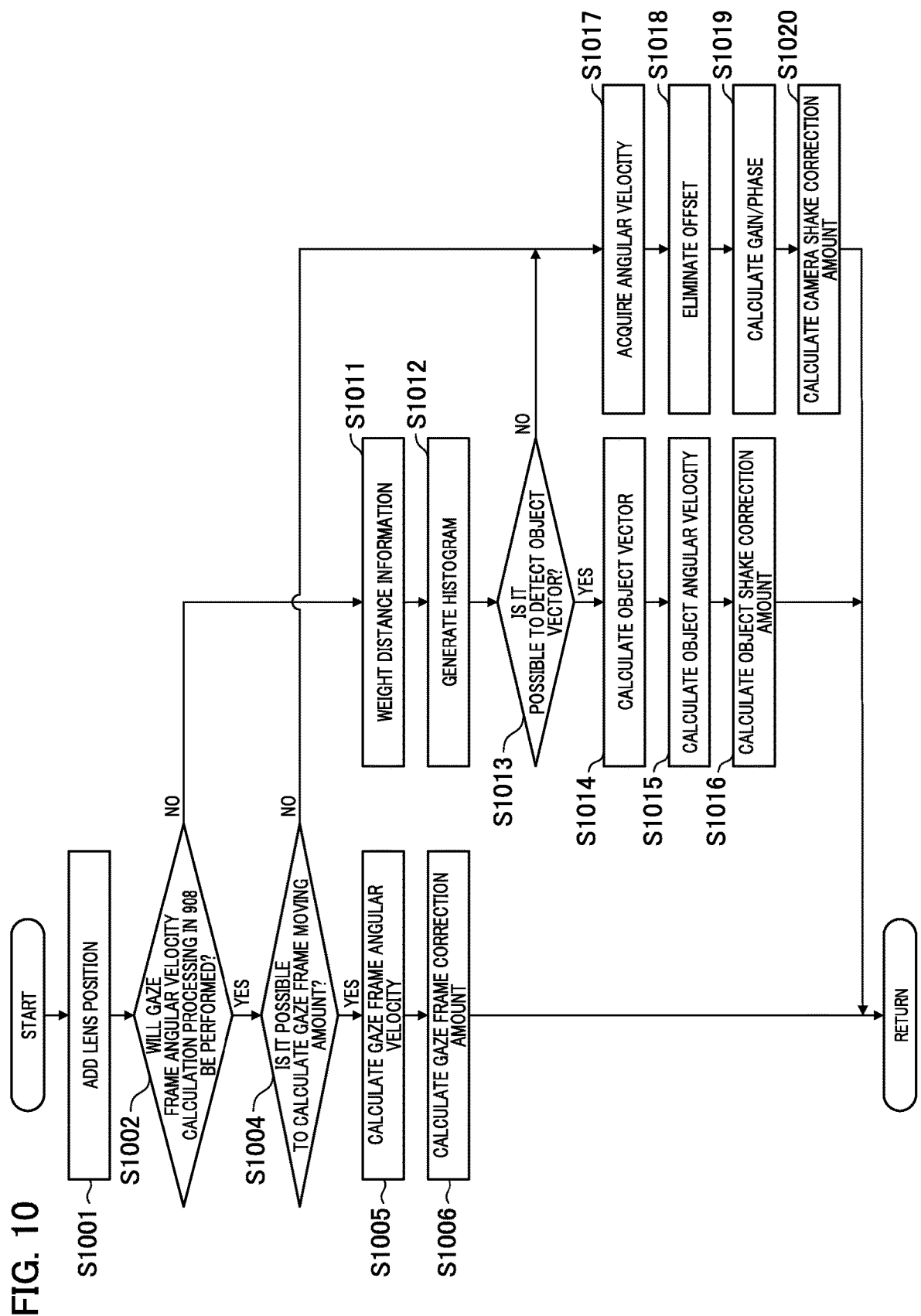

IMAGE PROCESSING APPARATUS, IMAGING APPARATUS, AND CONTROL METHOD

BACKGROUND OF THE INVENTION

Field of the Invention

The present invention relates to an image processing apparatus, an imaging apparatus, and a control method.

Description of the Related Art

A panning shot using imaging apparatuses such as a digital camera is widespread. The panning shot is a shooting method in which a shutter speed is set such that a predetermined shaking amount (hereinafter, referred to as a "background panning amount") can be obtained in an imaging element and a shot is performed while a camera follows the movement of an object in order to express the lively motion of the object.

The panning shot may not be easy for a user because it is performed while the camera follows the movement of the object so as not to cause a deviation in a shooting direction with respect to the movement of the object. When a deviation (object shake) occurs in the shooting direction with respect to the movement of the object, an image blur of the object occurs in the image.
Additionally, when an object moving at a high speed, for example, a racing car, is shot by a panning operation, a time required for focusing on the object is short, so that it is not easy to succeed in the panning shot.

In contrast, a technique that utilizes information regarding a user's line-of-sight has been proposed as a focus control technique for a camera. For example, Japanese Patent Application Laid-Open No. 6-294925 discloses a camera that detects a line-of-sight direction of a photographer and automatically focuses on an object that has been gazed at for a predetermined period of time. Additionally, Japanese Patent No. 2956543 discloses a camera that performs focus detection on an object image at a user's gaze position in a screen.

The prior arts disclosed in Japanese Patent Application Laid-Open No. 6-294925 and Japanese Patent No. 2956543 are difficult to adapt to a shooting when the shutter opportunity time is short, for example, a panning shot. Additionally, in the past, it has been impossible to correct image blur by controlling a shake correction optical system until the angular velocities of the object and the camera match to some extent, an object is recognized by focus control, and an amount of shaking of the object can be detected. Therefore, the timing for starting image blur correction during a panning shot is delayed.

SUMMARY OF THE INVENTION

According to the present invention, it is possible to assist a panning shot by performing image blur correction control before an object is brought into focus during the panning shot.

An image processing apparatus according to an embodiment of the present invention comprises a correction control unit configured to correct the image blur of a captured image by driving a correction unit; a determination unit configured to determine a specified region of the captured image; and a focus control unit configured to execute focus control to focus on an object.

If a panning shot will be performed, the focus control unit executes the focus control after the correction control unit drives the correction unit based on the movement of the specified region to execute a first correction control in which the image blur of the specified region is corrected.

Further features of the present invention will become apparent from the following description of exemplary embodiments with reference to the attached drawings.

BRIEF DESCRIPTION OF THE DRAWINGS

FIG. 10 illustrates calculation processing of a gaze frame angular velocity and an object angular velocity.

DESCRIPTION OF THE EMBODIMENTS

First Embodiment

Figure 1:
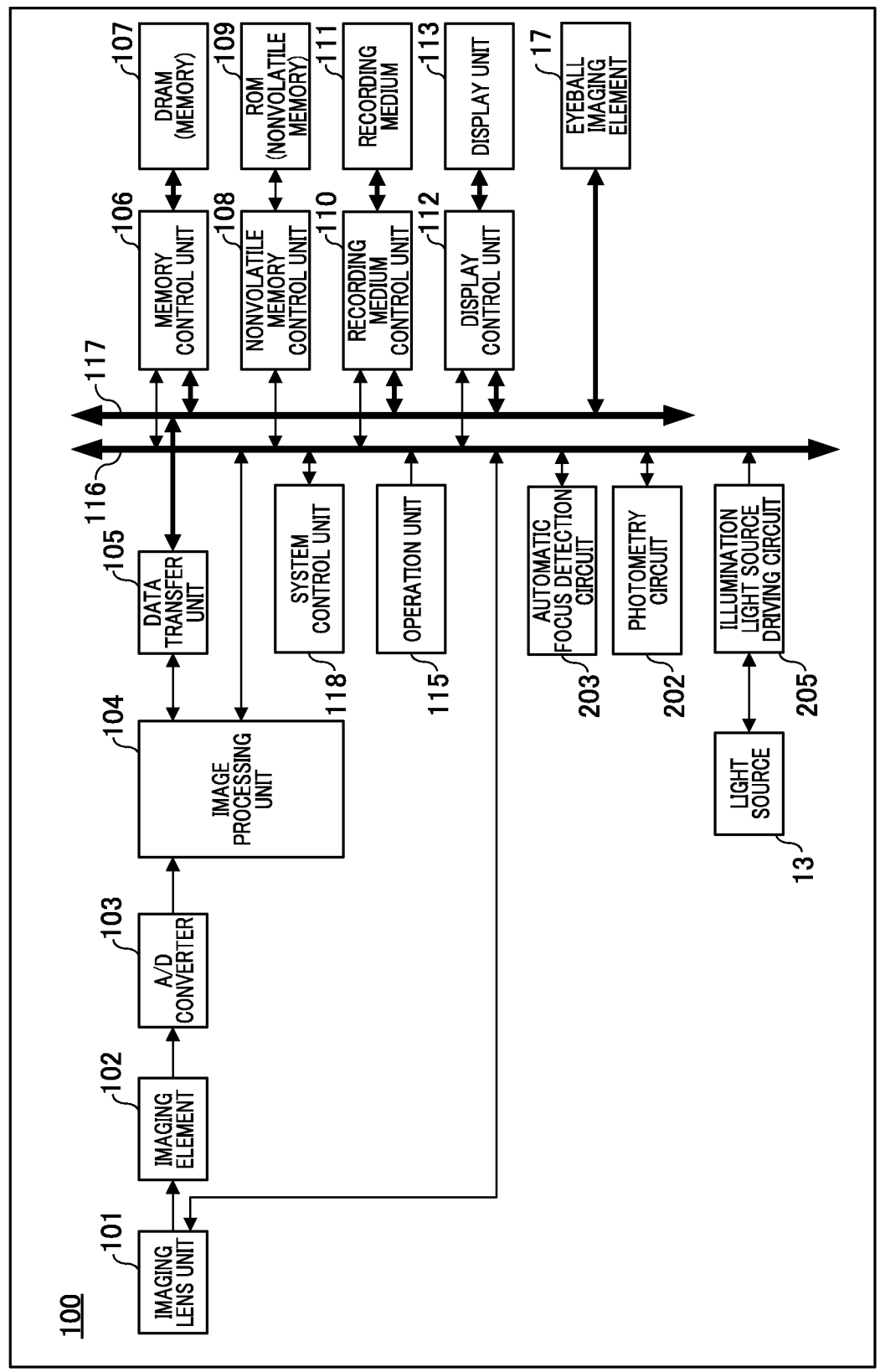
FIG. 1 illustrates a configuration of an imaging apparatus.

FIG. 1 illustrates a configuration of an imaging apparatus serving as an example of an image processing apparatus of the present embodiment. In FIG. 1, a digital camera 100 will be described as an example of the imaging apparatus of the present embodiment. The present invention is not limited to the digital camera 100 and can be applied to any image processing apparatuses, optical equipment, and the like that execute panning shot assisting control before focus control. The digital camera 100 has components from an illumination light source 13 to an illumination light source driving circuit 205. An imaging lens unit 101 includes a plurality of lens groups including a focus lens and an image stabilizing lens, and a diaphragm. During a shot, the imaging lens unit 101 is controlled by a system control unit 118 having a CPU or the like to perform, for example, focus adjustment, exposure adjustment, and image blur correction. "CPU" is an abbreviation for "Central Processing Unit".

An imaging element 102 receives object light via the imaging lens unit 101, photoelectrically converts the object light into an electric signal (analog image signal), and outputs an image signal (analog image signal) of the captured image. The imaging element has, for example, a CCD and a CMOS sensor. "CCD" is an abbreviation for "Charge Coupled Device". "CMOS" is an abbreviation for "Complementary Metal Oxide Semiconductor".

An A/D converter 103 converts the analog image signal from the imaging element 102 into a digital image signal. The image data for the converted image signal is input to an image processing unit 104. A bus 116 is a system bus for transmitting control signals of each block from the system control unit 118. A bus 117 is a data bus mainly for transferring image data.

The system control unit 118 controls the entire digital camera 100. The system control unit 118 executes a control program recorded on a ROM 109 to realize each process of the present embodiment. "ROM" is an abbreviation for "Read Only Memory". The system control unit 118 controls the image processing unit 104, a data transfer unit 105, a memory control unit 106, a nonvolatile memory control unit 108, a recording medium control unit 110, a display control unit 112, an operation unit 115, and the imaging element 102 via the bus 116. The system control unit 118 also performs calculations required for control processing of each processing unit of the digital camera 100. The system control unit 118 also executes, for example, control of a lens and a diaphragm of the imaging lens unit 101, and a process of acquiring information such as a focal length.

The data transfer unit 105 has a plurality of DMACs that perform data transfer. "DMAC" is an abbreviation for "Direct Memory Access Controller". A DRAM 107 is a storage means (memory) that stores data. "DRAM" is an abbreviation for "Dynamic Random Access Memory". The DRAM 107 has a storage capacity sufficient to store, for example, data of a predetermined number of still images, data of a predetermined time period of moving images, audio data, constants, programs and the like for the operation of the system control unit 118. The memory control unit 106 writes and reads data to and from the DRAM 107 in accordance with an instruction from the system control unit 118 or the data transfer unit 105.

The nonvolatile memory control unit 108 writes and reads data to and from the ROM 109 in accordance with instructions from the system control unit 118. The ROM 109 is an electrically erasable/recordable memory, and an EEPROM or the like is used. The ROM 109 stores constants, programs, and the like for the operation of the system controller 119.

The image processing unit 104 has a function unit that performs various types of image processing, a buffer memory, and the like. The image processing unit 104 performs processes such as magnification chromatic aberration correction, development process, noise reduction process, geometric deformation, resizing process such as enlargement and reduction on image data. The image processing unit 104 also performs pixel correction, black level correction, shading correction, and flaw correction on the image data converted by the A/D converter 103.

A recording medium 111 is a recording medium, for example, an SD card. The recording medium 111 is controlled by the recording medium control unit 110 to record image data or read out the recorded data. A display unit 113 has a liquid crystal display and an electronic viewfinder. The display unit 113 is controlled by the display control unit 112 and displays various image data transferred from the image processing unit 104 and a menu screen. Additionally, before shooting a still image or during a shot of a moving image, the display unit 113 processes the image data input from the A/D converter 103 in real time, and displays the processed image data. The operation unit 115 includes a changeover switch, a button, a touch panel or the like operated by a user. The operation unit 115 is used for operations such as turning on/off a power supply and turning on/off a shutter. A user can set various modes such as a panning shot mode by operating the changeover switch.

The illumination light source (hereinafter, referred to simply as a "light source") 13 is a light source that emits illumination light. The illumination light source driving circuit 205 drives the illumination light source 13. An eyeball imaging element 17 is an imaging element that photoelectrically converts an eyeball image of a user (observer). A photometry circuit 202 measures the brightness of the object necessary for calculating a proper exposure. An automatic focus detection circuit 203 executes focus control for automatically focusing on an object.

Figure 2:
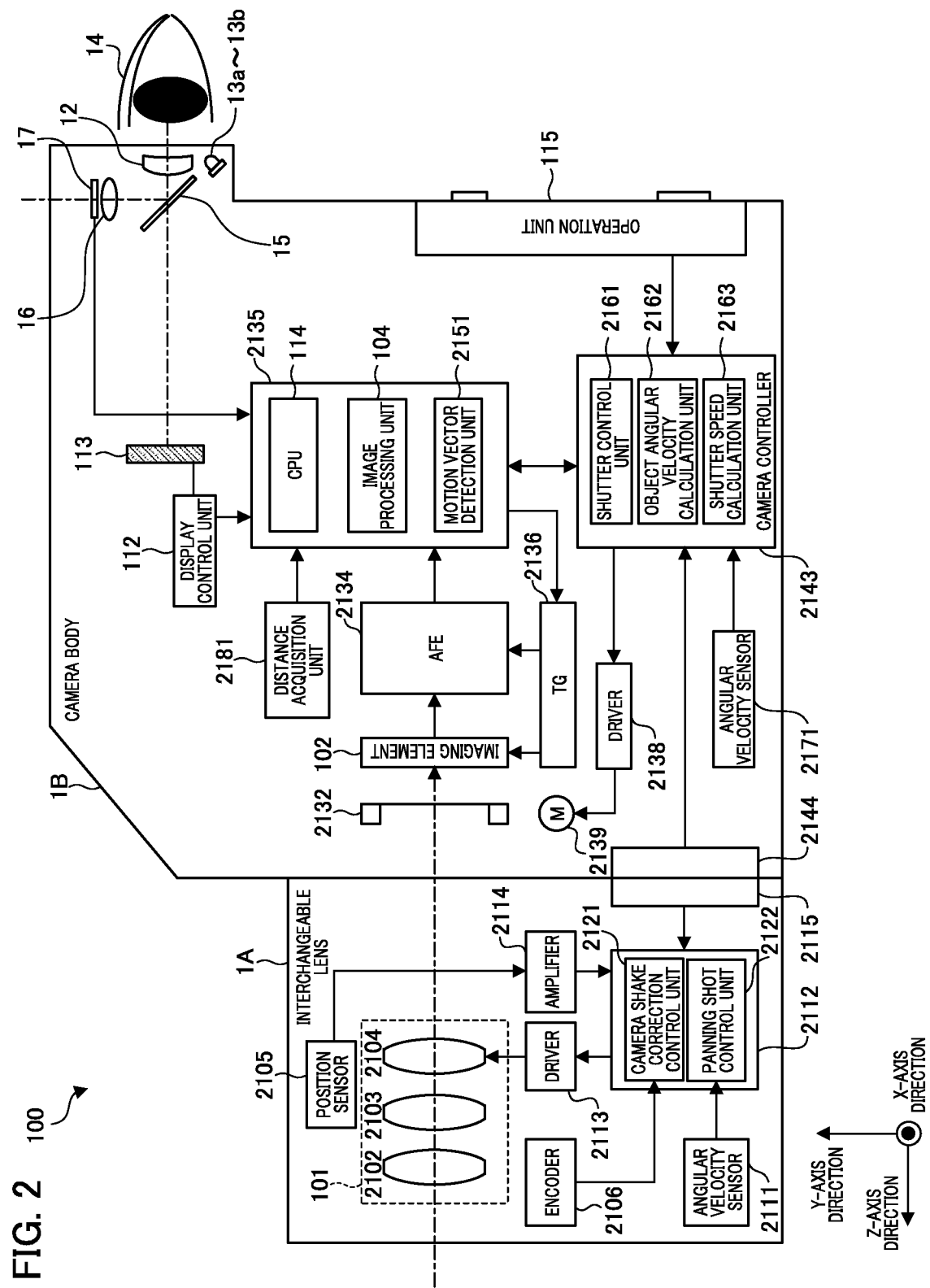
FIG. 2 is an example of a functional block diagram of the imaging apparatus.

FIG. 2 is an example of a functional block diagram of the imaging apparatus of the present embodiment. In FIG. 1 and FIG. 2, the corresponding components are denoted by the same reference numerals. The digital camera 100 that serves as the imaging apparatus of the present embodiment has a camera body 1B and an interchangeable lens 1A. The interchangeable lens 1A is attachable to and detachable from the camera body 1B. The camera body 1B may be used as the imaging apparatus of the present embodiment. The present invention can also be applied to a lens integrated camera.

The interchangeable lens 1A has components from the imaging lens unit 101 to a mount contact portion 2115. The camera body 1B has components from an eyepiece lens 12 to an angular velocity sensor 2171. First, the interchangeable lens 1A will be described.

The imaging lens unit 101 has an imaging optical system 2102, a zoom lens group 2103, and a shift lens group (hereinafter, also simply referred to as a "shift lens") 2104. The imaging optical system 2102 includes a fixed lens group and a focus lens. The zoom lens group 2103 is an optical member that can change the focal length. The shift lens group 2104 is a shake correction optical system for correcting an image blur that occurs in a captured image due to the shaking of the digital camera 100. The shift lens group 2104 is driven in a direction perpendicular to the optical axis of the imaging optical system 2102 under the control of a lens controller 2112, and thereby, the imaging position of light from the object is changed to correct image blur. Note that image blur may be corrected by applying the imaging element 102 as a shake correction optical system and driving the imaging element 102 in a direction perpendicular to the optical axis or in a rotational direction by, for example, a camera controller 2143.

A zoom encoder 2106 detects the position of the zoom lens group 2103. A position sensor 2105 detects the position of the shift lens group 2104. An angular velocity sensor 2111 is an example of shake detection means that detects shaking (angular velocity) of the digital camera 100. The angular velocity sensor 2111 outputs a signal indicating the detected shaking (shake detection signal).

The lens controller 2112 controls the entire interchangeable lens 1A. The lens controller 2112 performs drive control of the shift lens group 2104 through a driver 2113.

An amplifier 2114 amplifies the output of the position sensor 2105 and outputs a position detection signal of the shift lens group 2104 to the lens controller 2112.

The mount contact portion 2115 of the interchangeable lens 1A is connected to amount contact portion 2144 of the camera body 1B. Thus, communication between the interchangeable lens 1A and the camera body 1B becomes possible.

The lens controller 2112 includes a camera shake correction control unit 2121 and a panning shot control unit 2122. The camera shake correction control unit 2121 performs camera shake correction control. The camera shake correction control is control for correcting a blur of the captured image (image blur) caused by the shaking of the digital camera 100 due to camera shake or the like by driving the shift lens group 2104. The panning shot control unit 2122 performs panning shot assisting control. The panning shot assisting control is control for correcting an image blur of the object during panning shot by driving the shift lens group 2104.

Although the lens controller 2112 also performs focus control by the movement of the focus lens, diaphragm control, and the like, the description thereof will be omitted. In the camera shake correction control performed by the camera shake correction control unit 2121, although shaking is detected and corrected for two orthogonal axes that intersect perpendicularly, for example, in the horizontal direction and the vertical direction, the process for one of the two axes is the same as the process for the other axis, and thus, a description will be given of only one axis.

Next, the camera body 1B will be described. A shutter 2132 controls the exposure time. A timing generator (TG) 2136 sets an operation timing of the imaging element 102 and an analog signal processing circuit (AFE) 2134. The analog signal processing circuit 2134 processes an output signal of the imaging element 102 and supplies it to a camera signal processing circuit 2135. The camera signal processing circuit 2135 includes a CPU 114, the image processing unit 104, and a motion vector detection unit 2151. The CPU 114 controls the entire camera signal processing circuit 2135. The image processing unit 104 executes the image processing described with reference to FIG. 1. The signal after the image processing is output to the recording medium 111 to serve as a recording signal. The signal after the image processing is output to the display unit 113 to serve as a display signal. The motion vector detection unit 2151 detects a motion vector from a plurality of captured images having different imaging times based on the output signal of the imaging element 102.

The camera controller 2143 controls the entire camera body 1B. The camera controller 2143 includes a shutter control unit 2161, an object angular velocity calculation unit 2162, and a shutter speed calculation unit 2163. The shutter control unit 2161 controls a shutter drive motor 2139 via a driver 2138 to control the operation of the shutter 2132. The object angular velocity calculation unit 2162 calculates an angular velocity (object angular velocity) of an object. The object angular velocity calculation unit 2162 calculates an angular velocity of the object based, for example, on the motion vector detected by the motion vector detection unit 2151. The shutter speed calculation unit 2163 calculates a shutter speed when a panning shot mode is set.

The lens controller 2112 and the camera controller 2143 perform serial communication at a predetermined timing via the mount contact portions 2115 and 2144. The angular velocity sensor 2171 detects the shaking of the camera body 1B and outputs a shake detection signal to the camera controller 2143. A distance acquisition unit 2181 acquires the distance information (depth information) of the object and outputs it to the camera signal processing circuit 2135. The distance information is information indicating a distance relation between the digital camera 100 and the object in the depth direction.

When the user operates the power switch of the operation unit 115 to turn on the power of the digital camera 100, the camera controller 2143 detects that the power is turned on. The camera controller 2143 performs power supply to each circuit of the camera body 1B and the initial setting. Additionally, power is supplied to the interchangeable lens 1A, and the lens controller 2112 performs initial setting in the interchangeable lens 1A. After the camera controller 2143 and the lens controller 2112 become communicable, communication starts between them at a predetermined timing. In the communication from the camera controller 2143 to the lens controller 2112, the state of the camera body 1B, shooting setting information, and the like are transmitted. In the communication from the lens controller 2112 to the camera controller 2143, for example, the focal length information of the interchangeable lens 1A and the angular velocity information are transmitted.

The light sources 13a and 13b are light sources for illuminating an eyeball 14 of a user who is an observer with illumination light. The line-of-sight information (line-of-sight direction) of the user is detected based on the relation between an image (corneal reflected image) by the corneal reflection of the light source and the pupil. Light sources 13a and 13b have, for example, infrared light emitting diodes and are arranged around the eyepiece lens 12. The eyeball image and the cornea reflected image are transmitted through the eyepiece lens 12, reflected by a light splitter 15, and imaged on the eyeball imaging element 17 on which photoelectric element arrays such as a CCD are two-dimensionally arranged by a light receiving lens 16. The light receiving lens 16 positions the pupil of the eyeball 14 of the user and the eyeball imaging element 17 in a conjugate image formation relation. Under the control of the camera controller 2143, the camera signal processing circuit 2135 detects the line-of-sight information based on the positional relation between the eyeball image and the cornea reflected image imaged on the eyeball imaging element 17 by using a predetermined algorithm to be described below.

Figure 3:
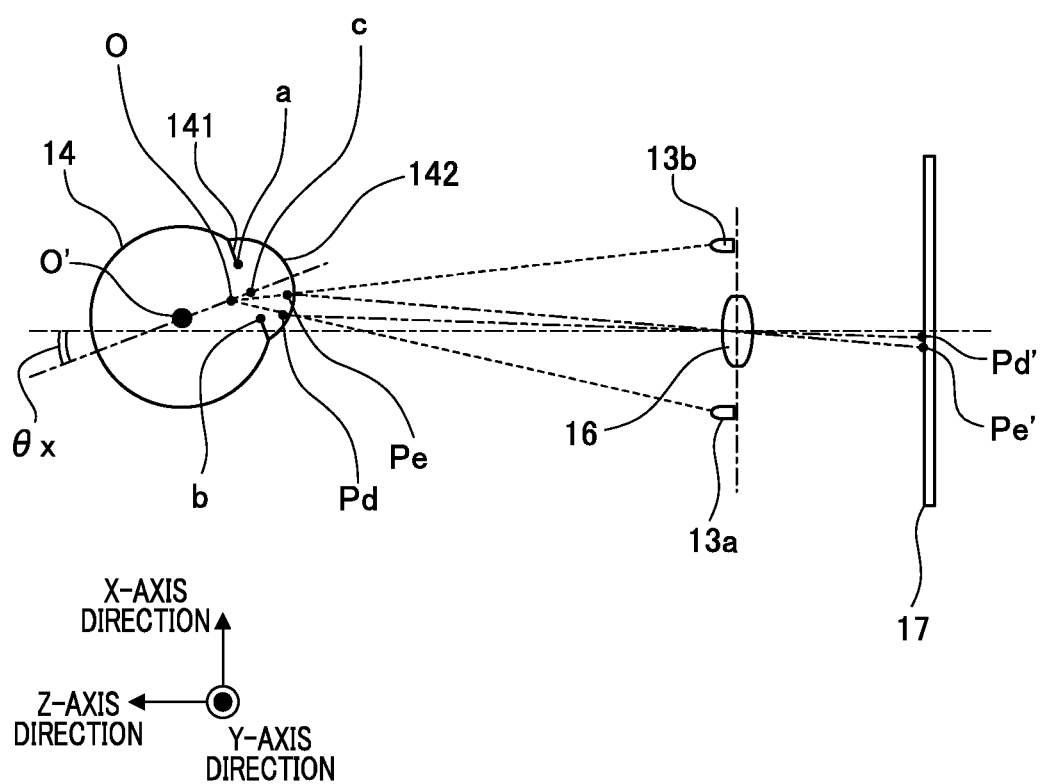
FIG. 3 illustrates a method for detecting line-of-sight information.
Figure 4:
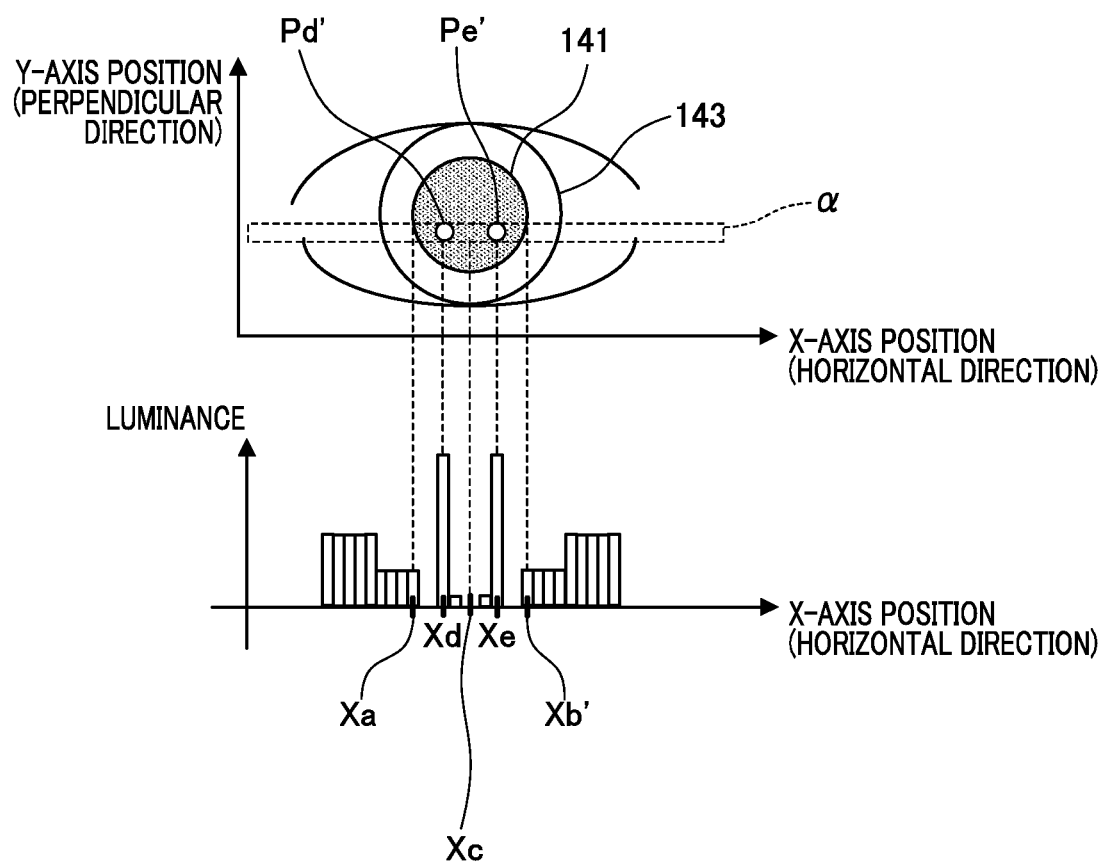
FIG. 4 illustrates an eyeball image and an output intensity of an eyeball imaging element.
Figure 5:
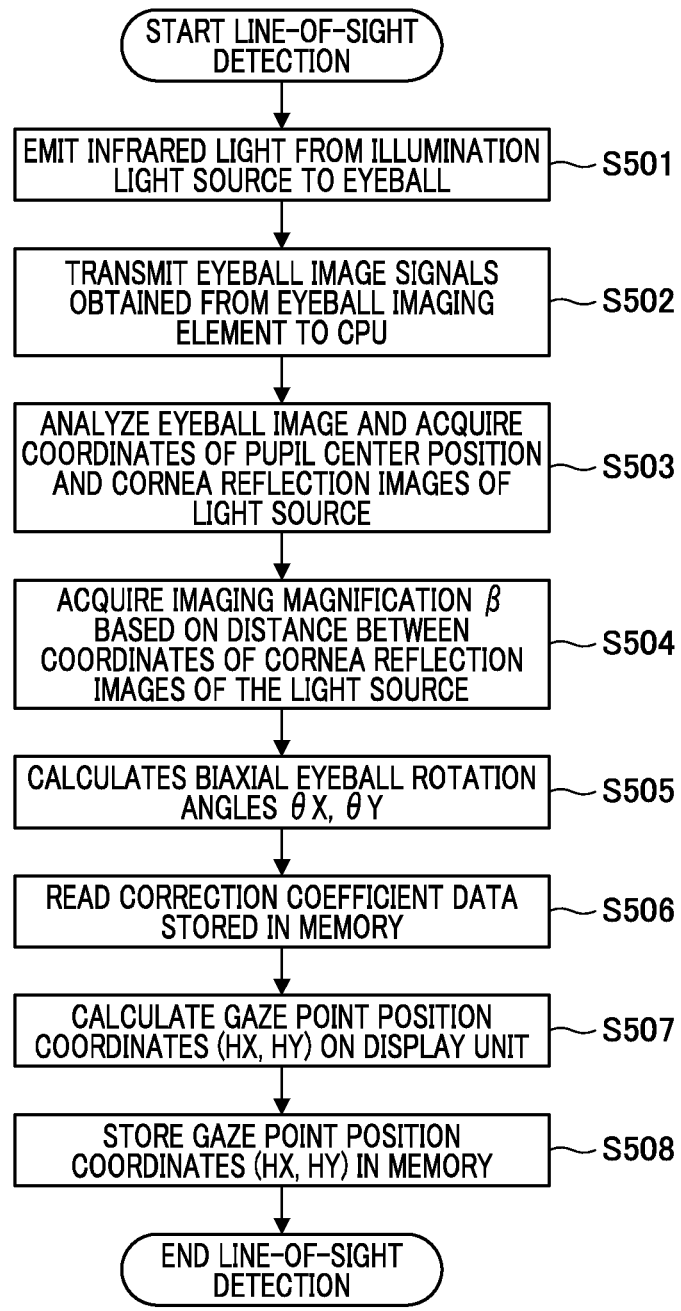
FIG. 5 is a flowchart that illustrates a detection process of the line-of-sight information.

FIG. 3 illustrates a method for detecting the line-of-sight information. FIG. 4 illustrates an eyeball image and the output intensity of the eyeball imaging element. An upper figure of FIG. 4 illustrates an eyeball image projected on the eyeball imaging element 17. A lower figure of FIG. 4 illustrates the output intensity of the CCD in the eyeball imaging element 17. FIG. 5 is a flowchart illustrating an example of the detection processing of the line-of-sight information. The process described with reference to FIG. 3 to FIG. 5 is executed mainly in accordance with the control of the CPU 114 of the camera signal processing circuit 2135. Note that "S" in FIG. 5 denotes a step number corresponding to each process in the flowchart.

FIG. 3 illustrates an optical system for detecting the line-of-sight information. The light sources 13a and 13b are light sources such as a light emitting diode that emits infrared light insensible to the user. Each light source is arranged substantially symmetric with respect to the optical axis of the light receiving lens 16 and illuminates the eyeball 14 of the user with illumination light. A part of the illumination light reflected from the eyeball 14 is converged on the eyeball imaging element 17 by the light receiving lens 16.

In FIG. 5, the detection routine of line-of-sight information starts. In step S501, the light sources 13a and 13b emit infrared light toward the eyeball 14 of the user (observer). An eyeball image of the user illuminated by infrared light is imaged on the eyeball imaging element 17 through the light receiving lens 16, and is photoelectrically converted by the eyeball imaging element 17. Thus, the eyeball image can be processed as an electric signal.

In step S502, the eyeball image signal obtained from the eyeball imaging element 17 is transmitted to the CPU 114. In step S503, the CPU 114 obtains the coordinates of the point corresponding to cornea reflection images Pd and Pe of the light sources 13a and 13b and the pupil center c shown in FIG. 3, based on the information regarding the eyeball image signal obtained in step S502. The infrared light emitted from the light sources 13a and 13b illuminates a cornea 142 of the eyeball 14 of the user. At this time, the cornea reflection images Pd and Pe formed by a part of the infrared light reflected on the surface of the cornea 142 are condensed by the light receiving lens 16 and imaged on the eyeball imaging element 17 (Points Pd' and Pe' in the drawing). Similarly, light beams from ends a and b of a pupil 141 also images an image on the eyeball imaging element 17.

The upper figure of FIG. 4 illustrates an example of an image of a reflected image obtained from the eyeball imaging element 17. The lower figure of FIG. 4 illustrates an example of the luminance information obtained from the eyeball imaging element 17 in an image region a in the upper figure of FIG. 4. In the lower figure of FIG. 4, the horizontal direction is denoted by the X-axis and the vertical direction is denoted by the Y-axis. It is assumed that the coordinates in the X-axis direction (horizontal direction) of the images Pd' and Pe' imaged by the corneal reflection images of the light sources 13a and 13b are respectively denoted by "Xd" and "Xe". The coordinates in the X-axis direction of images a' and b' obtained by imaging the light beams from the ends a and b of the pupil 14b are denoted by "Xa" and "Xb".

Extremely high-level luminance is obtained at positions Xd and Xe corresponding to images Pd' and Pe' obtained by imaging of the cornea reflection images of the light sources 13a and 13b in the graph shown in the lower figure of FIG. 4. Extremely low-level luminance is obtained in the region between the coordinates Xa and Xb, which corresponds to the region of the pupil 141, except for the positions Xd and Xe. In contrast, an intermediate value of the two luminance levels is obtained in a region having a value of the X coordinates that is lower than Xa and a region having a value of the X coordinates that is higher than Xb, which correspond to the region of a luster 143 that is outside the pupil 141. Based on the variation information of the luminance level with respect to the X-coordinate position, it is possible to obtain Xd and Xe, which are the X-coordinates of the images Pd' and Pe' obtained by the imaging of the cornea reflection images of the light sources 13a and 13b, and Xa and Xb, which are the X-coordinates of the images a' and b' of the pupil end.

Additionally, when a rotation angle x of the optical axis of the eyeball 14 with respect to the optical axis of the light receiving lens 16 is small, the coordinates Xc of a portion (c') corresponding to the pupil center c imaged on the eyeball imaging element 17 can be expressed by the following formula (1).

$$Xc \approx (Xa+Xb)/2 \quad \text{Formula (1)}$$

Accordingly, the X coordinate of c' corresponding to the pupil center imaged on the eyeball imaging element 17 and the coordinates of the cornea reflection images Pd' and Pe' of the light sources 13a and 13b can be obtained.

The description will return to FIG. 5. In step S504, the CPU 114 calculates an imaging magnification P of the eyeball image. P is a magnification determined by the position of the eyeball 14 with respect to the light receiving lens 16, and can be substantially obtained as a function of the interval (Xd-Xe) between the cornea reflection images Pd' and Pe'.

Next, in step S505, the CPU 114 calculates the rotation angles θx and θy of the eyeball 14. θx is a rotation angle of the eyeball 14 in the Z-X plane. Additionally, ay is a rotation angle when the eyeball 14 rotates in a plane perpendicular to the X axis (in the Z-Y Plane). Specifically, θx and θy correspond to the direction of use's line-of-sight.

The X coordinate at the midpoint between the cornea reflection images Pd and Pe is substantially coincident to the X coordinate at the center of curvature O of the cornea 142. Accordingly, if a standard distance between the center of curvature O of the cornea 142 and the center c of the pupil 141 is Oc, θx can be obtained by the following formula (2).

$$\beta \times Oc \times \text{SIN } \theta X \approx ((Xd+Xe)/2) - Xc \quad \text{Formula (2)}$$

A method for calculating θy is the same as the method for calculating θx.

Next, in step S506, the CPU 114 reads coefficient data necessary for the process in step S507 from the memory (DRAM 107). The coefficient data that are read are coefficients m, Ax, Bx, Ay, and By to be described below.

Next, in step S507, the CPU 114 calculates gaze point position coordinates (Hx, Hy) on the display unit 113 by using θx, θy and the coefficient data read in step S506. The gaze point position coordinates am the position specified by the user's line of sight on the display unit 113, in other words, the position of a point (gaze point) gazed at by the user. More specifically, the gaze point position coordinates (Hx, Hy) are coordinates corresponding to the center of the pupil 141 on the display unit 113. Hx and Hy can be calculated by the following formula (3) and formula (4).

$$Hx = m \times (Ax \times \theta x + Bx) \quad \text{Formula (3)}$$

$$Hy = m \times (Ay \times \theta y + By) \quad \text{Formula (4)}$$

The coefficient "m" is a constant determined by a configuration of a finder optical system of the digital camera 100. Specifically, the coefficient "m" is a conversion coefficient used to convert the rotation angles θx and θy to the position coordinates corresponding to the center c of the pupil 141 on the display unit 113. Additionally, Ax, Bx, Ay, and By are line-of-sight correction coefficients used to correct individual differences in the user's line-of-sight. Ax, Bx, Ay, and By are acquired by performing a predetermined calibration operation and stored in the memory in advance.

Next, in step S508, the CPU 114 stores the gaze point position coordinates in the memory. The CPU 114 also measures a time during which the position specified by the user's line-of-sight remains in a certain region as a gaze time and stores it in the memory. Subsequently, the line-of-sight detection routine ends. The gaze point position coordinates stored in the process of step S508 correspond to the user's line-of-sight information. The gaze time may be included in the gaze information. While the method for acquiring the coordinates of the gaze point position using the corneal reflection images of the light sources 13a and 13b has been exemplified, any method for acquiring an eyeball rotation angle from the eyeball image can be applied to the present invention.

Figure 6:
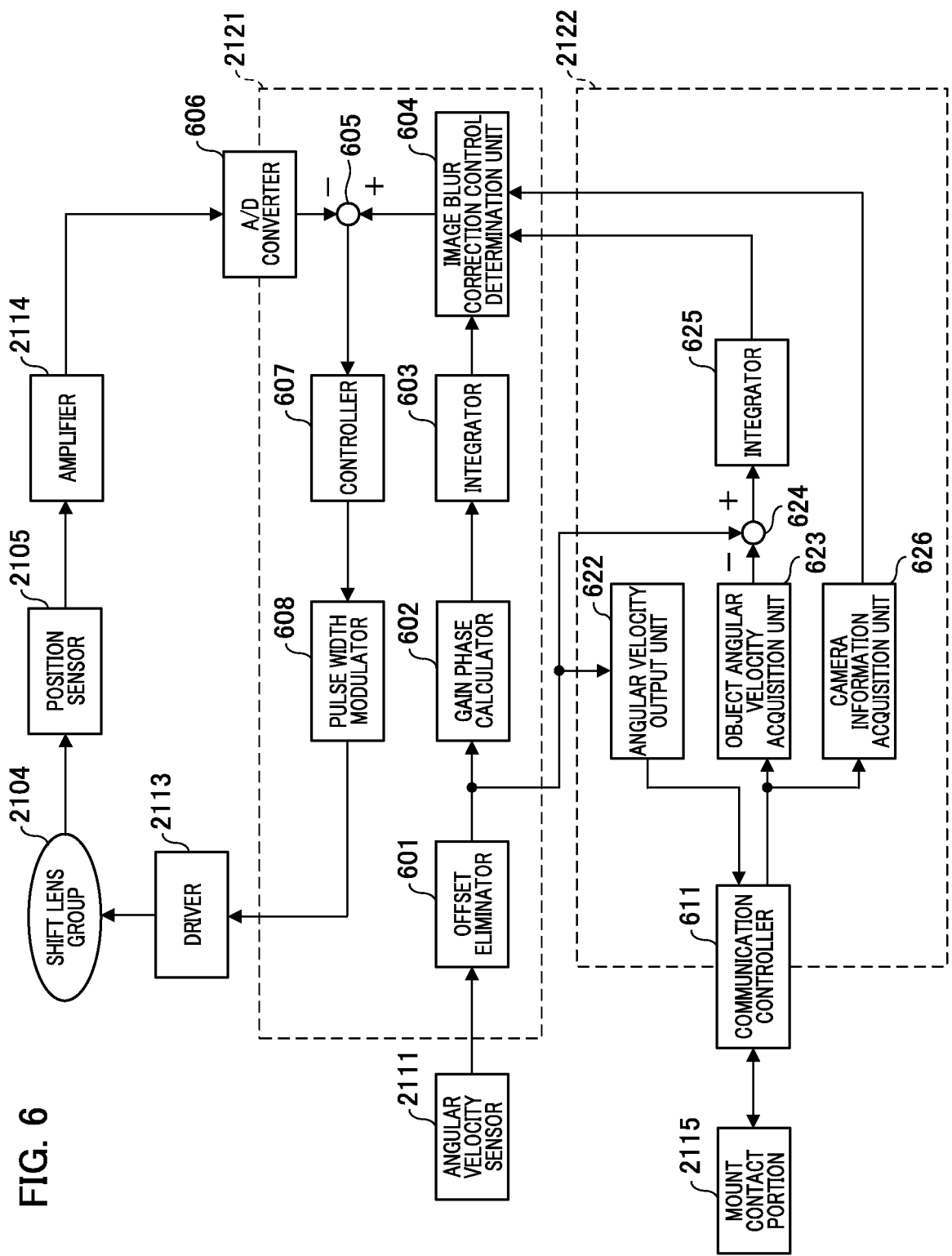
FIG. 6 illustrates a configuration related to camera shake correction control and panning shot assisting control.

FIG. 6 illustrates an example of the configuration related to the camera shake correction control and the panning shot assisting control of the digital camera 100. The components shared by FIG. 1 and FIG. 2 are denoted by the same reference numerals already used and the detailed description thereof will be omitted. The user can switch the shooting mode between a normal mode and a panning shot mode by operating the changeover switch of the operation unit 115. When the normal mode has been selected, the angular velocity sensor 2111 detects shaking (angular velocity) applied to the digital camera 100 due to camera shake or the like, in the interchangeable lens 1A. The camera shake correction control unit 121 performs drive control of the shift lens group 2104 based on the shake detection signal from the angular velocity sensor 2111. As a result, camera shake correction control is performed to reduce image blur of the captured image.

An offset eliminator 601 of the camera shake correction control unit 2121 eliminates an offset included in the shake detection signal from the angular velocity sensor 2111. The offset eliminator 601 eliminates a DC component included in the shake detection signal by a filter operation unit that has, for example, a high-pass filter (HPF) (not illustrated). A gain phase calculator 602 acquires the output of the offset eliminator 601 and performs amplification and phase compensation. The gain phase calculator 602 has an amplifier that amplifies the angular velocity signal from which the offset component has been eliminated with a predetermined gain, and a phase compensation filter. An integrator 603 integrates the output of the gain phase calculator 602. The integrator 603 has a function of changing the characteristics in an arbitrary frequency band and calculating a driving amount of the shift lens group 2104.

The camera shake correction control unit 2121 determines whether or not a panning/tilting operation is being performed. For example, when the angular velocity indicated by the shake detection signal from the angular velocity sensor 2111 is a predetermined threshold or more and a predetermined time has elapsed, the camera shake correction control unit 2121 determines that the digital camera 100 is in, for example, a panning operation. The camera shake correction control unit 2121 may further determine that the digital camera 100 is in a panning operation when further determining that the user is gazing at the object based on the line-of-sight information obtained in the line-of-sight detection routine described above. When the camera shake correction control unit 2121 determines whether or not the panning/tilting operation is being performed, it gradually changes a cutoff frequency of the HPF in the offset eliminator 601 to the high-frequency side. The camera shake correction control unit 2121 performs control to return the shift lens group 2104 to the optical center position by gradually changing the cutoff frequency to the high frequency side and gradually reducing a target signal of the camera shake correction control. If this control is not performed, camera shake correction control is performed by an angular velocity detection signal of shaking that is large enough to be determined to be a panning operation. As a result, the shift lens group 2104 reaches a correction limit point (a limit position within a control range), and the user may see, on the screen, an unnatural change in the angle of view for shooting. The occurrence of such a phenomenon can be prevented by performing a process of gradually changing the cutoff frequency of the HPF to the high frequency side.

An image blur correction control determination unit (hereinafter, referred to as a "control determination unit") 604 acquires each output of the integrator 603 and an integrator 625 and switches the signal for driving the shift lens group 2104 in accordance with the output of a camera information acquisition unit 626 as follows:

(1) If the shooting mode is set to the panning shot mode, the control determination unit 604 selects the output of the integrator 225 calculated by the panning shot control unit 2122.

(2) If the shooting mode is set to a mode other than the panning shot mode, the control determination unit 604 selects the output of the integrator 603 calculated by the camera shake correction control unit 2121.

The position sensor 2105 detects the position of the shift lens group 2104 and outputs a position detection signal. The amplifier 2114 amplifies the position detection signal. An A/D converter 606 digitizes the position detection signal amplified by the amplifier 2114, and outputs the digitized signal to a subtractor 605. The subtractor 605 performs subtraction by using the output of the control determination unit 604 as a positive input and by using the output of the A/D converter 606 as a negative input, and outputs deviation data, which is a subtraction result, to a controller 607. The controller 607 includes an amplifier that amplifies the deviation data output from the subtractor 605 with a predetermined gain, and a phase compensation filter. The deviation data is processed by the amplifier and the phase compensation filter in the controller 607, and then is output to a pulse width modulator 608. The pulse width modulator 608 acquires the output data of the controller 607, modulates it to a PWM waveform, and outputs the modulated data to the driver 2113 for driving a shift lens. A voice coil motor is used to drive the shift lens group 2104 and the driver 2113 moves the shift lens group 2104 in a direction perpendicular to the optical axis in accordance with the output of the pulse width modulator 608. Thus, camera shake correction control can be realized.

Next, a description will be given of the panning shot assisting control when the panning shot mode is set. When the user performs an operation for setting the shooting mode to the panning shot mode by the operation unit 115 shown in FIG. 2, the camera controller 2143 switches the control related to image blur correction to the panning shot assisting control. When the camera controller 2143 transmits the fact that the control related to the image blur correction has been switched to the panning shot assisting control to the lens controller 2112, the control related to image blur correction is switched to the panning shot assisting control in the lens controller 2112 as well.

The camera information acquisition unit 626 of the panning shot control unit 2122 acquires various types of camera information transmitted from the camera controller 2143 via a communication controller 611. The camera information is, for example, setting information of the panning shot assisting mode and release information. The camera information acquisition unit 626 outputs information necessary for processing to the control determination unit 604. An angular velocity output unit 622 acquires the output of the offset eliminator 601, that is, the shake detection signal from the angular velocity sensor 2111 from which the offset component has been eliminated.

The angular velocity output unit 622 transmits the shake detection signal to the camera controller 2143 via the communication controller 611 and the mount contact portions 2115 and 2144. An object angular velocity acquisition unit 623 acquires the angular velocity data of the object calculated by the object angular velocity calculation unit 2162 in the camera body 1B via the mount contact portions 2144 and 2115 and the communication controller 611. A subtractor 624 performs subtraction by using the output of the offset eliminator 601 as a positive input, and by using the output of the object angular velocity acquisition unit 623 as a negative input. Thus, a deviation between the angular velocity of the object acquired by the object angular velocity acquisition unit 623 and the angular velocity indicated by the shake detection signal from which the offset component has been eliminated is calculated. The subtractor 624 outputs the calculated deviation to the integrator 625. The integrator 625 integrates the deviation, and outputs the result for the integration calculation to the control determination unit 604.

In the process of calculating the angular velocity of the object performed by the object angular velocity calculation unit 2162 of the camera controller 2143, for example, a moving amount of the image is detected as a motion vector and a vector of the object (object vector) is detected from the detected motion vector. Subsequently, the object angular velocity calculation unit 2162 calculates an angular velocity (object angular velocity) of the object corresponding to the detected object vector.

A process of detecting an object vector will be described below with reference to FIG. 7, FIG. 8A and FIG. 8B. During a panning shot, the motion vector detection unit 2151 of the camera signal processing circuit 2135 detects a motion vector of an image from a plurality of captured images (video information).

Figure 7:
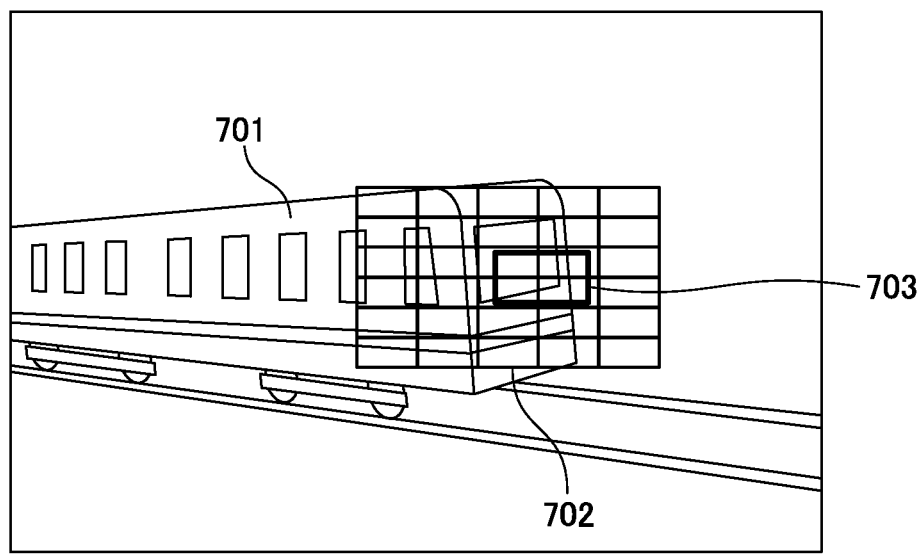
FIG. 7 illustrates an example of a shooting scene of an object that is a moving body.

FIG. 7 illustrates an example of a shooting scene of an object 701, which is a moving body. The horizontal direction of the shooting screen is defined as the X direction and the vertical direction thereof is defined as the Y direction. The two types of vectors detected by the motion vector detection unit 2151 are a vector corresponding to a part of the object 701 and a vector corresponding to a background portion. A detection frame 702 for detecting a motion vector has a plurality of detection blocks shown by a rectangular frame. FIG. 7 also illustrates a focus frame (focus detection frame) 703 for focusing on an object.

In setting of the detection frame 702 shown in FIG. 7, a dense type disposition whom the detection frame 702 is disposed in the vicinity of the focus frame 703 is performed in order to correct only the image blur related to the object by the shake correction optical system in the panning shot. Specifically, a detection accuracy of each detection block corresponding to the detection frame 702 can be improved by setting the dense type disposition.

Next, the relation between the distance information acquired by the distance acquisition unit 2181 and the motion vector detected by the motion vector detection unit 2151 will be described. As described above, the distance information (depth information) is information indicating the distance relation between the digital camera 100 and the object in the depth direction. The distance information can be broadly classified into two types of distances: a close direction distance and an infinite direction distance (direction of infinity). The close direction distance is a distance from a camera position to an object on the camera side, and is distance information an object portion corresponding to the focus frame (703 in FIG. 7) (short-distance information). The infinite direction distance is a distance from the camera position to an object on the background side and is distance information of the background portion, which does not correspond to the focus frame (long-distance information).

As a method for acquiring the distance information, the following method can be applied. The distance acquisition unit 2181 acquires the distance information by using an autofocus sensor (AF sensor) for phase difference detection.

For example, the digital camera 100 includes an AF-dedicated detection unit, which detects a phase difference of an image signal, and can acquire an amount of image deviation, a defocus amount of defocus, and the like as distance information. The distance acquisition unit 2181 may acquire an AF evaluation value from an image signal by an imaging element 133 by contrast detection, and acquire distance information by using the evaluation value. A pupil division type imaging element having an image plane phase difference detection function may also be used. By applying the pupil division type imaging element, incident light passing through a shooting lens is divided into two directions, and as a result, a pair of image signals can be obtained. In other words, a photoelectric conversion unit of the imaging element receives light passing through different pupil partial regions of the imaging optical system. The distance acquiring unit 2181 acquires, as the distance information, an amount of image deviation, a defocus amount, and the like based on a phase difference between a pair of image signals after photoelectric conversion.

The camera signal processing circuit 2135 weighs the distance information corresponding to each detection block in the detection frame 302 of FIG. 7 based on the distance information acquired from the distance acquiring unit 2181. For example, weighting processing is performed such that the distance information of the detection blocks corresponding to a background portion is set to 30 m and the distance information of the detection blocks corresponding to the object portion is set to 10 m. A clustering accuracy of the object vector and the background vector can be improved by using the distance information.

Figure 8A:
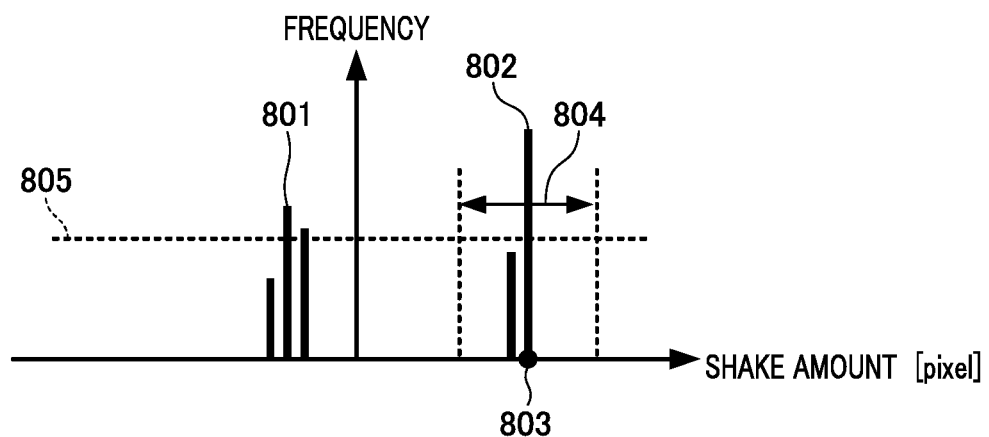
FIGS. 8A and 8B are histograms related to a motion vector.
Figure 8B:
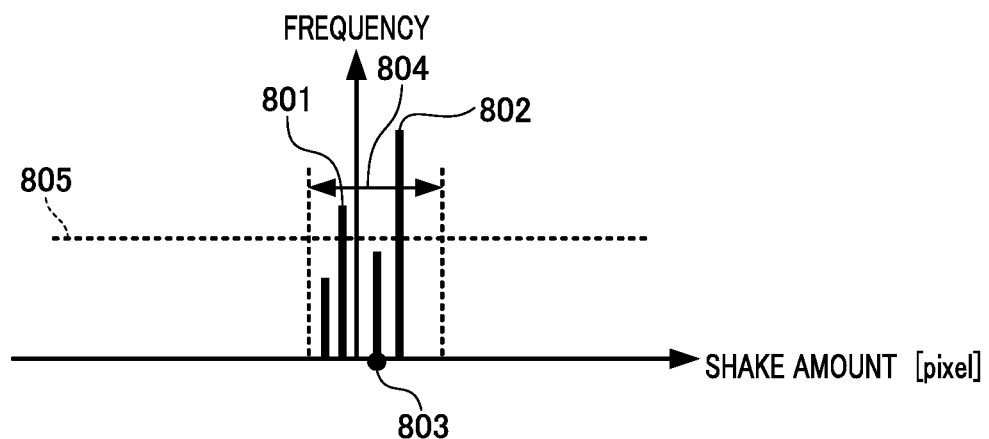

FIG. 8A and FIG. 8B illustrate the result for calculating a histogram (frequency distribution) of the motion vector detected by the motion vector detection unit 2151. The horizontal axis of the histogram shown in FIG. 8A and FIG. 8B denotes an amount of shaking (unit: pixel) and corresponds to a motion vector. The vertical axis indicates frequencies of the motion vector. FIG. 8A illustrates a histogram in a direction in which the user shakes the digital camera 100 at a predetermined angular velocity or more (for example, in the horizontal direction in FIG. 7).

In the example of the shooting scene shown in FIG. 7, vectors detected by the motion vector detection unit 2151 are broadly classified into two types of vectors: a motion vector of an image corresponding to the object shake (a deviation between the object and the digital camera in a shooting direction) and a motion vector of an image corresponding to background shake.

The motion vector detection unit 2151 compares the image of one frame before with the image of the current frame at the set detection block position to detect a movement of the image. However, there are cases in which it is impossible to determine whether the movement of the image is a movement of an object image or a movement of a background image based only on detection values. Thus, in the present embodiment, an object vector and a background vector are separated based on the detection values of the motion vector detection unit 2151 by using distance information and an output of the angular velocity sensor. A process of detecting only the object vector will be described below.

In FIG. 8A, a first vector group 801 near the shake amount 0 and a second vector group 802 near a shake amount 803 are detected. The shake amount 803 corresponds to the angular velocity information, which is the output of the angular velocity sensor 2171 that is converted into a movement amount on the imaging element 133. The second vector group 802 is a vector group existing within a predetermined range 804 centered on the shake amount 803. The predetermined range 804 is a threshold range for background determination and is set in advance. A threshold 805 of frequency is a threshold for determining whether or not the vector is valid. The camera controller 2143 determines a vector that is within the predetermined range 804 centered on the shake amount 803, and has a frequency equal to or higher than the threshold 805 as a candidate of a background vector. In the example shown in FIG. 8A, a vector having a frequency equal to or greater than the threshold 805 of the second vector group 802 is determined to be a candidate of the background vector (background vector candidate). The camera controller 2143 determines a vector that exists outside the predetermined range 804 and has a frequency is equal to or higher than the threshold 805 as a candidate of the object vector (object vector candidate). In the example of FIG. 8A, a vector having a frequency that is equal to or greater than the threshold 805 of the first vector group 801 is determined to be an object vector candidate.

The reason for providing the predetermined range 804 for background determination in the present embodiment is to prevent the erroneous detection of the motion vector detection unit 2151 due, for example, to variations in an output of the angular velocity sensor 2171, variations in the focal length, and the like. The camera controller 2143 finally checks the distance information of the object vector candidate, and if the information of the closest distance side has been acquired, a vector detected at a detection block closest to the focus frame 703 is selected as an object vector (FIG. 7). Note that the closest detection block to the focus frame 703 is used as a start point and that a process of integrating a predetermined number of object vectors around the closest detection block may be performed. Although, in the present embodiment, the angular velocity sensor 2171 in the camera body 1B is used for detection of the object vector, the angular velocity sensor 2111 in the interchangeable lens 1A may be used. Alternatively, the angular velocity sensors 2111 and 2171 may be used together.

FIG. 8B illustrates a histogram in a moving direction in which the user shakes the camera at a predetermined angular velocity or less or in a direction in which the camera is not moved. For example, in FIG. 8B, a histogram in the vertical direction in FIG. 7 is shown. In FIG. 8B, all vectors detected by the motion vector detection unit 2151 are included in the predetermined range 804 for background determination because the angular velocity in shaking of the camera 100 is very small. However, actually, a slight object shaking may occur even in a direction other than a panning (or tilting) direction of the camera. In order to extract slight object shaking, a detection block closest to the focus frame 703 is selected if the distance information of the detection block closest to the focus frame 703 has been acquired. Note that the closest detection block to the focus frame 703 is used as a start point and a process of integrating a predetermined number of object vectors around the closest detection block may be performed.

After the object vector has been determined, the object angular velocity calculation unit 2162 calculates an object angular velocity. The angular velocity [degrees/sec] can be calculated from an amount of image plane movement [pixel] by using a process opposite to a process of converting from the angular velocity [degrees/sec] to the amount of image plane movement [pixels] by using a focal length, a frame rate, and a pixel pitch in the imaging element. The camera controller 2143 transmits a value obtained by adding angular velocity data from the angular velocity output unit 622 in the interchangeable lens 1A to the object angular velocity calculated by the object angular velocity calculation unit 2162 to the lens control unit 212. The lens controller 2112 in the interchangeable lens 1A receives information transmitted from the camera controller 2143 via the mount contact portions 2144 and 2115.

Figure 9A:
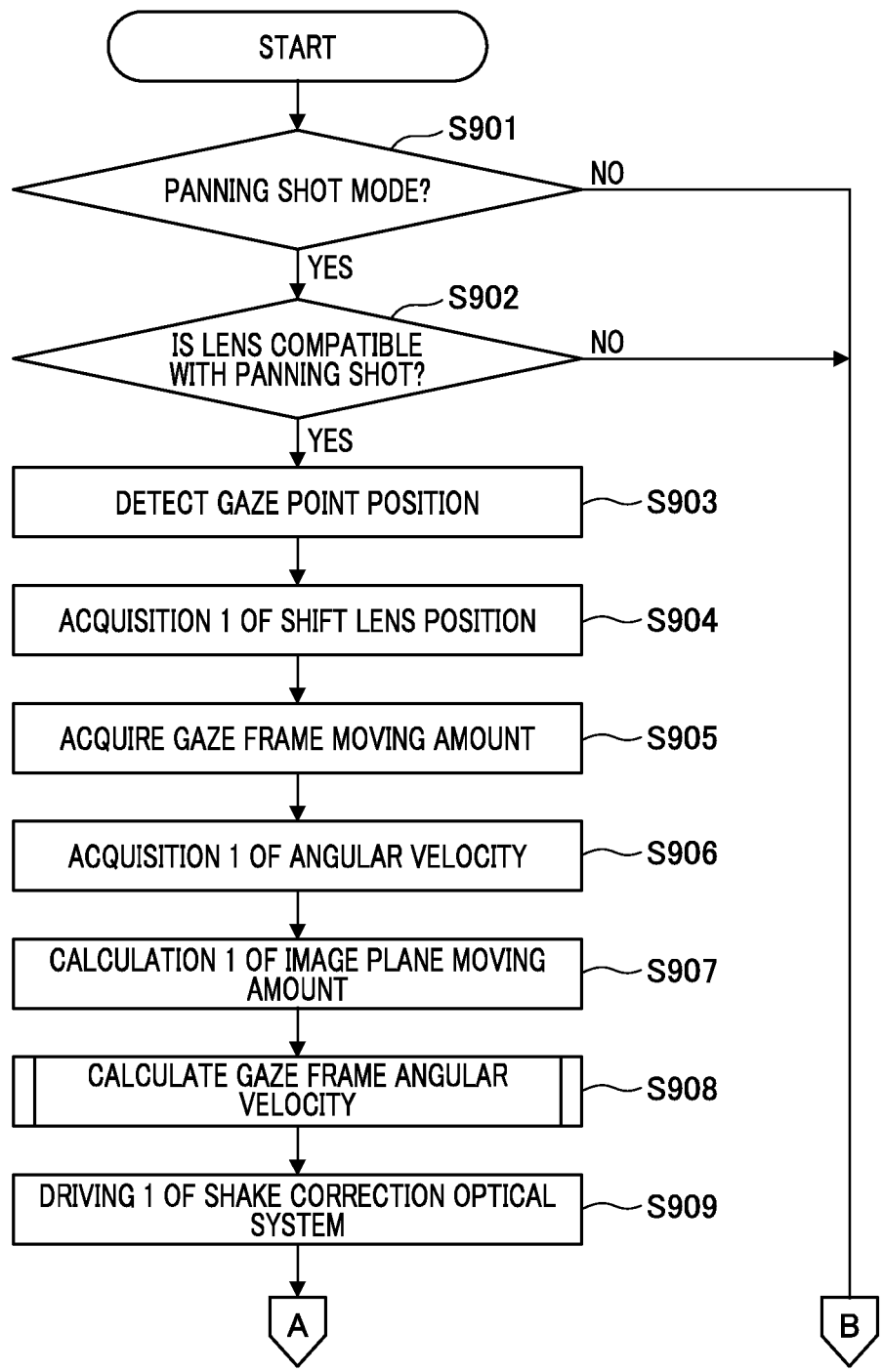
FIGS. 9A and 9B are flowcharts illustrating panning shot assisting control.
Figure 9B:
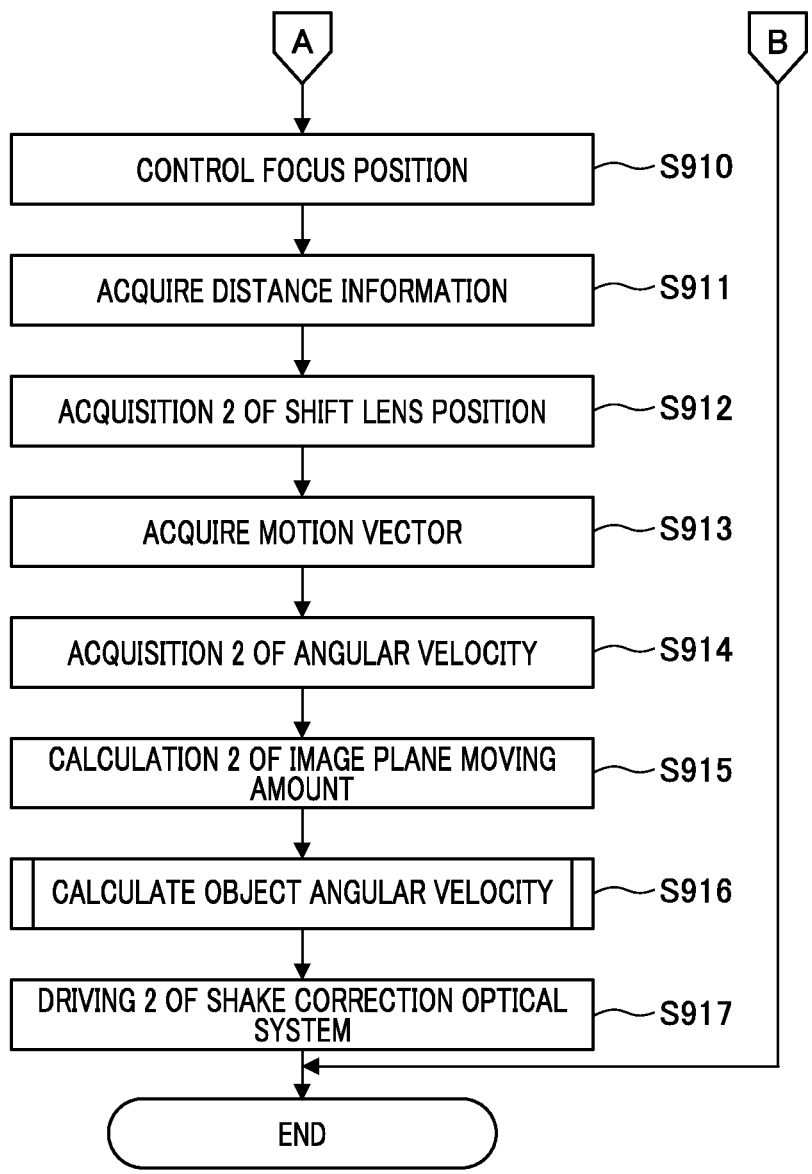

FIGS. 9A and 9B are flowcharts that illustrates the panning shot assisting control in the first embodiment. The following process is realized when the camera controller 2143, the camera signal processing circuit 2135, and the lens controller 2112 interpret and execute a predetermined control program. Specifically, in the present embodiment, the camera controller 2143, the camera signal processing circuit 2135, and the lens controller 2112 function as correction control means that executes control for driving the shift lens group 2104 to correct image blur. Note that "S" in FIGS. 9A and 9B denotes a step number corresponding to each process in the flowchart.

(S901) Determination Processing of Panning Shot Mode

The camera controller 2143 determines whether or not the panning shot mode has been set. When the panning shot mode has been set, the process proceeds to step S902. When the normal mode has been set, the control of the panning shot mode is not performed, and the process ends.

(S902) Determination Processing of Interchangeable Lens 1A

The camera controller 2143 determines whether or not an interchangeable lens 1A mounted on the camera body 1B is an interchangeable lens compatible with a panning shot mode. If it is determined that the interchangeable lens 1A is an interchangeable lens compatible with the panning shot mode, the process proceeds to step S903. When the camera controller 2143 determines that the interchangeable lens 1A is an interchangeable lens that is not compatible with the panning shot mode, the process ends. The process of determining whether or not the interchangeable lens 1A is compatible with the panning shot mode is performed based on the lens information signal transmitted from the lens controller 2112 to the camera controller 2143. If a lens communication function is not provided in cameras such as a compact digital camera or the like, the determination processing in step S902 is not necessary, and the process proceeds to step S903.

(S903) Detection of Gaze Point Position

The camera signal processing circuit 2135 detects a gaze point position at which the user gazes by the process described with reference to FIG. 5. Subsequently, the camera signal processing circuit 2135 sets a gaze frame indicating a region including the detected gaze point position (gaze region). The region surrounded by the gaze frame is a gaze region. Subsequently, the process proceeds to step S904. Note that the gaze region is an example of a specified region specified by a user or a region specified in advance. The scope of the present invention is not limited to a region specified by the user's line of sight. For example, the gaze frame may be set in a region specified by a user's touch operation or the like on a predetermined screen.

Figure 11:
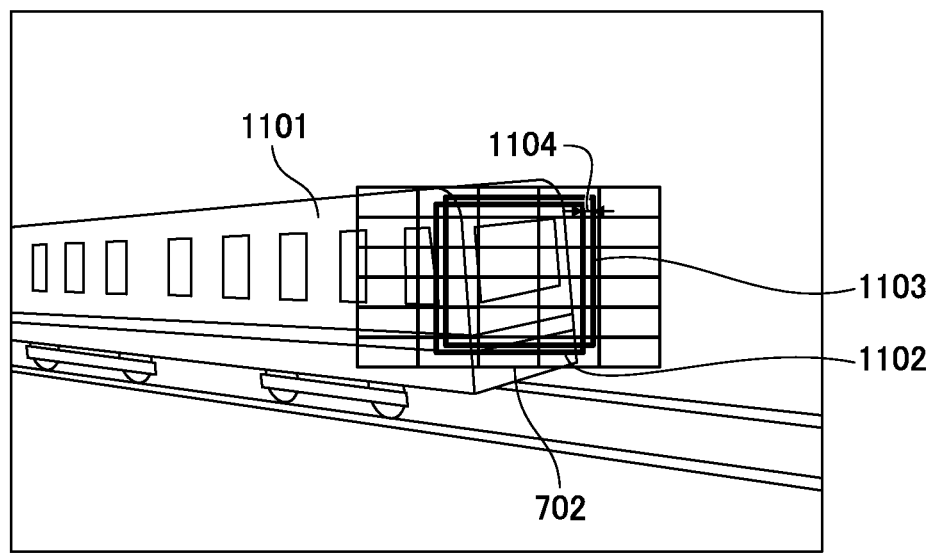
FIG. 11 illustrates an example of a shooting scene of an object that is a moving body.

FIG. 11 illustrates an example of a shooting scene of an object 1101 that is a moving body. A gaze frame 1102 indicates a gaze region in the current frame. A gaze frame 1103 indicates a gaze region in the next frame. The description will return to FIG. 9A.

(S904) Acquisition 1 of Position of Shift Lens Group 2104

The camera controller 2143 acquires the position information of the shift lens group 2104 detected by the position sensor 2105 from the lens controller 2112. The acquired position information of the shift lens group 2104 is an average value of the output of the position sensor 2105 synchronized with a detection period of time of the motion vector detection unit 2151. Subsequently, the process proceeds to step S905.

(S905) Acquisition of Moving Amount of Gaze Frame

The camera controller 2143 acquires a moving amount of the gaze frame indicating the movement of the gaze frame between consecutive frames. For example, the camera controller 2143 acquires a gaze frame moving amount 1104 that is a moving amount from the gaze frame 1102 to the gaze frame 1103 in FIG. 11. Subsequently, the process proceeds to step S906.

(S906) Acquisition 1 of Angular Velocity

The camera controller 2143 acquires a shake detection signal (angular velocity) detected by the angular velocity sensor 2111 from the lens controller 2112. The camera controller 2143 also acquires a shake detection signal (angular velocity) detected by the angular velocity sensor 2171 in the camera body 1B. A value of the shake detection signal acquired in this step is an average value of the output of the angular velocity sensor 2111 or the angular velocity sensor 2171 synchronized with the time period for acquiring the moving amount of the gaze frame in step S905. Subsequently, the process proceeds to step S915.

(S907) Calculation 1 of Moving Amount of Image Plane

The camera controller 2143 performs a calculation that converts the angular velocity acquired in step S906 into a moving amount of the image plane. Specifically, the camera controller 2143 calculates a moving amount (image plane moving amount) on the image plane based on the angular velocity detected by the angular velocity sensor 2111 in the interchangeable lens 1A, the focal length of the imaging optical system, and the frame rate. Subsequently, the process proceeds to step S908.

(S908) Calculation of the Gaze Frame Angular Velocity

The object angular velocity calculation unit 2162 calculates an angular velocity of the gaze frame (gaze frame angular velocity) based on the gaze frame moving amount 1104 acquired in step S905. The gaze frame angular velocity is, for example, an angular velocity according to the movement from the gaze frame 1102 to the gaze frame 1103 in FIG. 11. The details of the calculation processing of the gaze frame angular velocity will be described below with reference to FIG. 10. Subsequently, the process proceeds to step S909.

(S909) Driving 1 of Shake Correction Optical System

The lens controller 2112 receives the gaze frame angular velocity calculated in step S908 from the camera controller 2143. The panning shot control unit 2122 of the lens controller 2112 determines a control amount for driving the shift lens group 2104 based on the gaze frame angular velocity. The driver 2113 drives the shift lens group 2104 in accordance with the determined control amount. Accordingly, the blur of the image in the region of the gaze frame (image blur according to a gaze region) with respect to the shaking of the digital camera 100 is corrected. The control to correct the image blur in the gaze region (first correction control) in step S909 is executed before the focus control in step S910 to be described below.

(S910) Focal Position Control

The lens controller 2112 performs focus control for focusing on the object 1101. Automatic focusing is performed based on the detection result of the image plane phase difference. The zoom lens group 2103 in the interchangeable lens 1A is driven to adjust the focal position. Subsequently, the process proceeds to step S911.

(S911) Acquisition of Distance Information

The distance acquisition unit 2181 acquires the distance information associated with the captured image. The motion vector detection unit 2151 sets the detection frame 702 of the motion vector. Subsequently, the process proceeds to step S912.

(S912) Acquisition 2 of Position of Shift Lens Group 2104

The camera controller 2143 acquires the position information of the shift lens group 2104 detected by the position sensor 2105 from the lens controller 2112. The acquired position information of the shift lens group 2104 is an average value of the outputs of the position sensor 2105 synchronized with the detection time period of the motion vector detected by the motion vector detection unit 2151. Subsequently, the process proceeds to step S913.

(S913) Acquisition of Motion Vector

The motion vector detection unit 2151 detects a motion vector from an image for a region in the detection frame 702. Subsequently, the process proceeds to step S914.

(S914) Acquisition 2 of Angular Velocity

The camera controller 2143 acquires the shake detection signal (angular velocity) detected by the angular velocity sensor 2111 from the lens controller 2112. The camera controller 2143 also acquires the shake detection signal (angular velocity) detected by the angular velocity sensor 2171 in the camera body 1B. The value of the shake detection signal acquired in this step is an average value of the outputs of the angular velocity sensor 2111 or the angular velocity sensor 2171 synchronized with the detection time period of the motion vector detected by the motion vector detection unit 2151. Subsequently, the process proceeds to step S915.

(S915) Calculation 2 of Moving Amount of Image Plane

The camera controller 2143 performs a calculation that converts the angular velocity acquired in step S914 into a moving amount of the image plane. Specifically, the camera controller 2143 calculates a moving amount on the image plane (image plane moving amount) by using the angular velocity detected by the angular velocity sensor 2111 in the interchangeable lens 1A, the focal length of the imaging optical system, and the frame rate. Subsequently, the process proceeds to step S916.

(S916) Calculation of Object Angular Velocity

The object angular velocity calculation unit 2162 calculates an object angular velocity based on the motion vector acquired in step S913. The calculation of the object angular velocity will be described below with reference to FIG. 10.

(S917) Driving of Shake Correction Optical System

The panning shot control unit 2122 of the lens controller 2112 receives the object angular velocity calculated in step S916 from the camera controller 2143, and determines a control amount for driving the shift lens group 2104 during exposure time-period. The driver 2113 drives the shift lens group 2104 in accordance with the determined control amount. Thus, after the focus control (S910), control to correct image blur of the object (second correction control) is executed. Subsequently, the process ends.

FIG. 10 is a flowchart that illustrates the calculation processing of the gaze frame angular velocity in step S908 and the calculation processing of the object angular velocity in step S917 in FIG. 9B. "S" in FIG. 10 denotes a step number corresponding to each process in the flowchart.

(S1001) Addition of Lens Position

The camera controller 2143 executes a process of adding a value of the position information of the shift lens group 2104 acquired in step S904 or step S912 in FIGS. 9A and 9B to a detection value of the motion vector detection unit 2151. Accordingly, even if the shift lens group 2104 is driven by the camera shake correction control during the detection of the motion vector, an image of the object shake can be obtained. Subsequently, the process proceeds to step S1002.

(S1002) Determination of Calculation Processing of Gaze Frame Angular Velocity

The camera controller 2143 determines whether or not to perform the calculation processing of the gaze frame angular velocity in step S908. When it determines that the calculation processing of the gaze frame angular velocity in step S908 will be performed, the process proceeds to step S1004. When the calculation processing of the object angular velocity in S917 will be performed instead of the calculation processing of the gaze frame angular velocity in S908, the process proceeds to S1011.

(S1004) Determination of Whether or not to Calculate Moving Amount of Gaze Frame The camera controller 2143 determines whether or not the gaze frame moving amount 1104 has been acquired in step S905. If the gaze frame moving amount 1104 has been acquired, the process proceeds to step S1005. If the gaze frame moving amount 1104 has not been acquired, the process proceeds to step S1017.

(S1005) Calculation of Gaze Frame Angular Velocity

The object angular velocity calculation unit 2162 calculates a gaze frame angular velocity. Specifically, a process of calculating the gaze frame angular velocity based on the image plane moving amount of the gaze frame (gaze frame moving amount 1104) is performed by using a method opposite to the method for calculating the image plane moving amount based on the angular velocity in S907 or S915 of FIGS. 9A and 9B. Subsequently, the process proceeds to step S1016.

(S1006) Calculation of Shake Correction Amount of Gaze Frame

The camera controller 2143 adds the value of the angular velocity that was transmitted from the angular velocity output unit 622 (FIG. 6) to the camera controller 2143 to the gaze frame angular velocity calculated in S1005, and transmits the added value to the lens controller 2112 to serve as the object angular velocity. The object angular velocity acquisition unit 623 outputs the object angular velocity received from the camera controller 2143 to the subtractor 624. The subtractor 624 calculates a difference between the angular velocity detected by the angular velocity sensor 2111 in the interchangeable lens 1A and the object angular velocity. The integrator 625 integrates the calculated difference and outputs the integrated value to the control determination unit 604 to serve as a target control value of image blur correction control (gaze frame shake correction amount). The gaze frame shake correction amount is a target control value of the shake correction optical system for correcting the image blur of the gaze region. Subsequently, the process proceeds to return processing.

(S1011) Weighting of Distance Information

The camera signal processing circuit 2135 weights the distance information corresponding to each detection block in the detection frame 702 of FIG. 11 based on the distance information acquired in step S911 of FIG. 9B. Subsequently, the process proceeds to step S1012.

(S1012) Generation of Histogram

The camera controller 2143 performs a histogram calculation related to a motion vector based on the motion vector acquired in step S913 of FIG. 9B. After generation of histogram, the process proceeds to step S1013.

(S1013) Determination of Whether or not to Detect Object Vector Candidates

The camera controller 2143 determines whether or not an object vector candidate could be detected based on the generated histogram. If the object vector candidate could not be detected, the process proceeds to step S1014. If the object vector candidate could not be detected, the process proceeds to step S1017.

(S1014) Calculation of Object Vector

The camera controller 2143 selects an object vector to be finally used from among object vector candidates. For example, if the object vector has been detected in the detection block closest to the position of the focus frame 703 (FIG. 7) and the distance information has been obtained, the vector detected in the closest detection block is selected as an object vector. Note that the closest detection block is used as a start point and the object vector around the closest detection block may be integrated. After the calculation of the object vector, the process proceeds to step S1015.

(S1015) Calculation of Object Angular Velocity

The object angular velocity calculation unit 2162 calculates the object angular velocity based on the image plane moving amount of an object corresponding to the object vector calculated in step S1014. The object angular velocity calculation unit 2162 calculates the object angular velocity by using a method opposite to the method for calculating the image plane moving amount based on the angular velocity in step S907 or step S915 of FIGS. 9A and 9B. Subsequently, the process proceeds to step S1016.

(S1016) Calculation of Object Shake Correction Amount

The camera controller 2143 adds the value of the angular velocity that has been transmitted from the angular velocity output unit 622 to the camera controller 2143 to the object angular velocity calculated in step S1015, and transmits the result to the lens controller 2112. The object angular velocity acquisition unit 623 acquires the object angular velocity transmitted from the camera controller 2143 to the lens controller 2112, and outputs the acquired object angular velocity to the subtractor 624. The subtractor 624 calculates the difference between the angular velocity that has been detected by the angular velocity sensor 2111 in the interchangeable lens 1A and the object angular velocity. The integrator 625 integrates the calculated difference, and outputs the integrated value to the control determination unit 604 to serve as a target control value of the shake correction optical system (object shake correction amount) for correcting the image blur of the object. Subsequently, the process proceeds to return processing.

(S1017) Acquisition of Angular Velocity

From this step, the control of the shake correction optical system is switched to the shake correction control performed by the camera shake correction control unit 2121. The camera shake correction control unit 2121 acquires an angular velocity indicated by the shake detection signal detected by the angular velocity sensor 2111 in the interchangeable lens 1A. Subsequently, the process proceeds to step S1018.

(S1018) Offset Elimination

The camera shake correction control unit 2121 cuts off a low frequency component included in the shake detection signal acquired in step S1017 by using a high-pass filter having a function capable of changing the characteristic thereof in an arbitrary frequency band, and then executes a process of outputting a signal in a high frequency band. Thereby, an offset component superimposed on the shake detection signal is eliminated. Subsequently, the process proceeds to step S1019.

(S1019) Gain/Phase Calculation the camera shake correction control unit 2121 amplifies the shake detection signal from which the offset component has been eliminated with a predetermined gain to perform phase compensation. Subsequently, the process proceeds to step S1020.

(S1020) Calculation of Shake Correction Amount

The camera shake correction control unit 2121 integrates the angular velocity of the signal processed by the integrator 603 in step S1019. The angle value obtained by the integration is output to the control determination unit 604 to serve as a target control value of the camera shake correction control (camera shake correction amount). Subsequently, the process proceeds to the return processing.

According to the image processing apparatus (digital camera 100) of the present embodiment, in the panning shot mode, it is possible to control the shake correction optical system at a timing before focusing on the object, based on the movement of the gaze region. Additionally, an angular velocity shake between the object and the camera operation is reduced during focus control to shorten a time for completing the detection of the image plane phase difference.

Second Embodiment

Figure 12A:
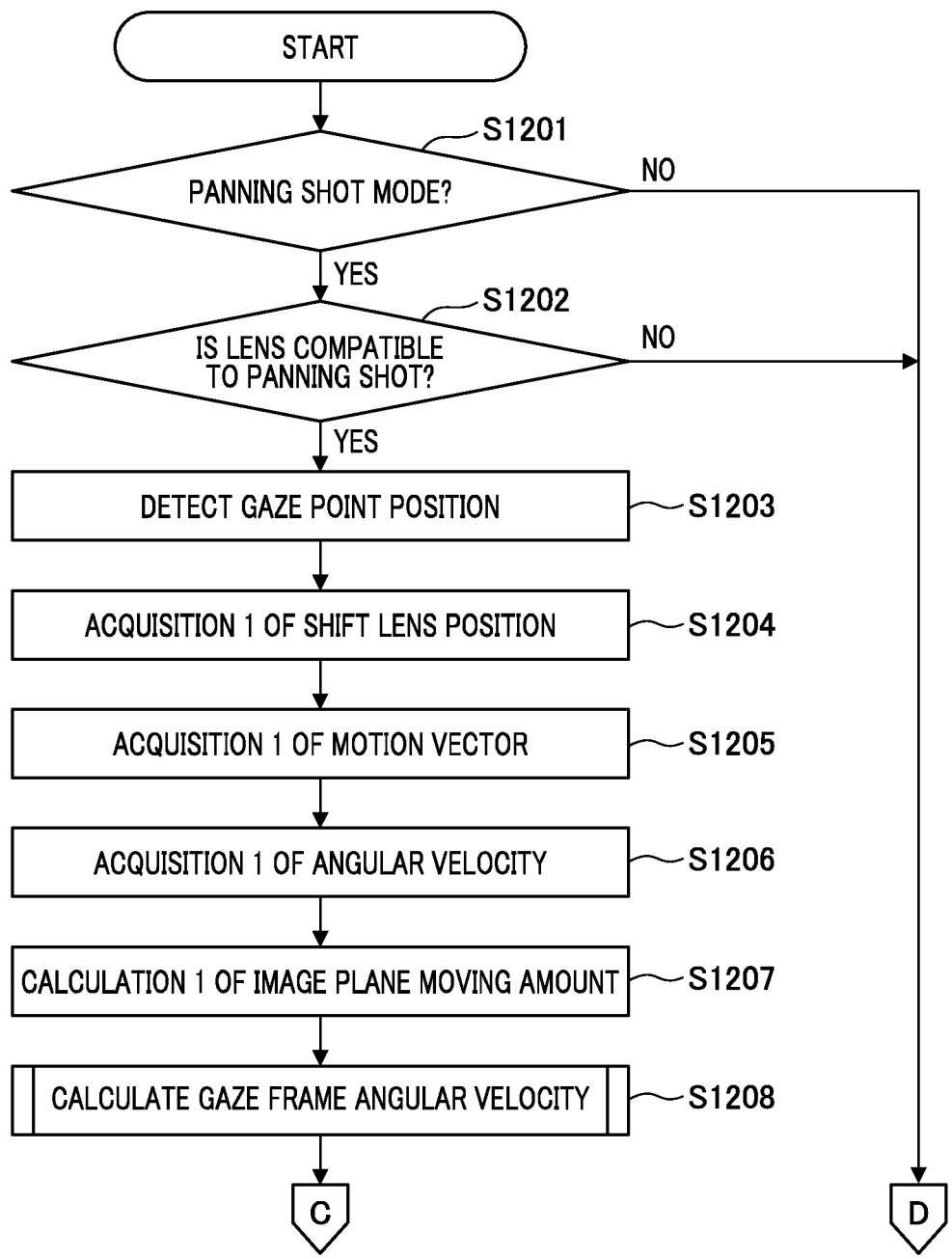
FIGS. 12A and 12B are flowcharts illustrating the panning shot assisting control.
Figure 12B:
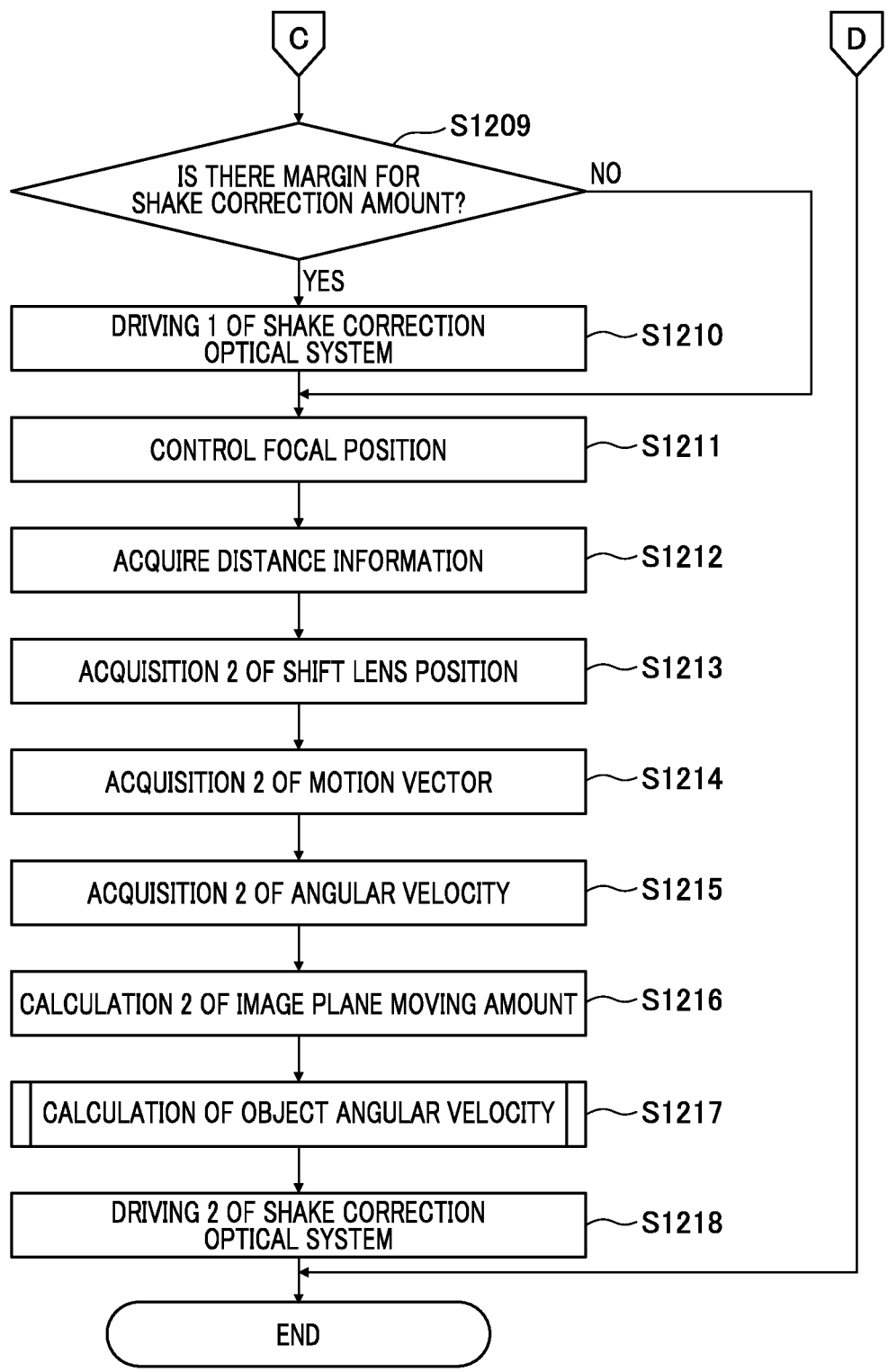

FIGS. 12A and 12B are flowcharts that illustrates the panning shot assisting control in the second embodiment. The configuration of the digital camera 100 in the second embodiment is the same as that of the digital camera in the first embodiment. The following process is realized when the camera controller 2143, the camera signal processing circuit 2135, and the lens controller 2112 interpret and execute a predetermined control program. "S" in FIGS. 12A and 12B denotes a step number corresponding to each process in the flowchart. The second embodiment will be described below with a focus on a difference from the first embodiment. Steps S1201 to S1204 are the same as steps S901 to S904 in FIG. 9A.

Figure 14:
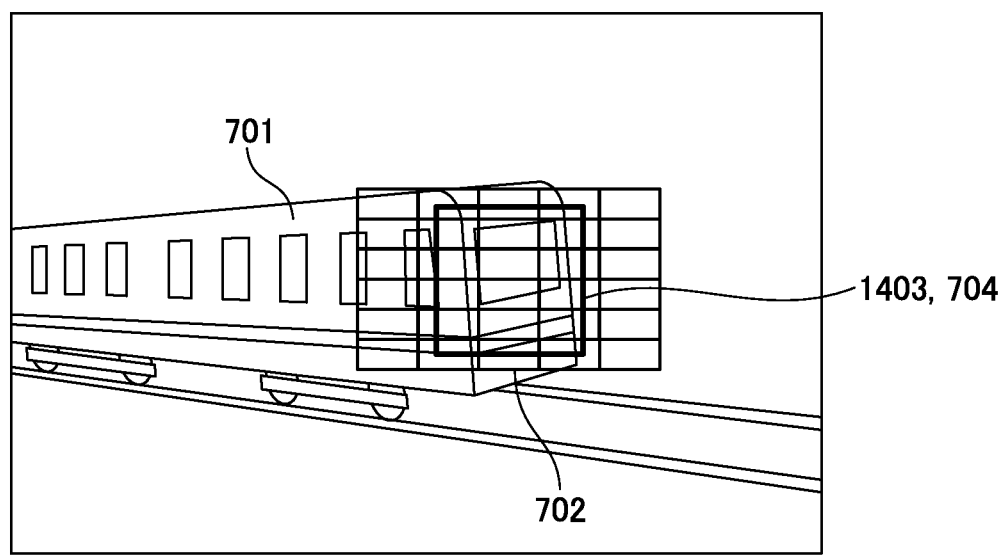
FIG. 14 illustrates an example of a shooting scene of an object that is a moving body.

FIG. 14 illustrates an example of a shooting scene of the object 701 that is a moving body. A region including the user's gaze point position detected in step S1203 becomes a gaze frame 1403. The description will return to FIG. 12A.

(S1205) Acquisition 1 of Motion Vector

The motion vector detection unit 2151 detects a movement in a detection frame 704 disposed so as to be superimposed on the gaze frame 1403 of FIG. 14 as a motion vector. Note that the detection frame 704 may be disposed in a predetermined region including the gaze frame 1403, and the size of the detection frame 704 does not have to match the gaze frame 1403. Additionally, in step S1205, the distance acquisition unit 2181 acquires distance information associated with the captured image. Subsequently, the process proceeds to step S1206. Steps S1206 and S1207 are the same as steps S906 and S907 in FIG. 9A.

(S1208) Calculation of Gaze Frame Angular Velocity

The object angular velocity calculation unit 2162 calculates the angular velocity of the gaze frame 1403 (gaze frame angular velocity) based on the information acquired in S1204 to S1206. The details of the calculation processing of the gaze frame angular velocity will be described below with reference to FIG. 13. Subsequently, the process proceeds to step 1209.

(S1209) Determination of Control Amount

The lens controller 2112 receives the gaze frame angular velocity calculated in step S1208 from the camera controller 2143. The panning shot control unit 2122 of the lens controller 2112 determines the control amount for driving the shift lens group 2104 to correct the blur of an image in the region of the gaze frame (image blur for a gaze region) based on the gaze frame angular velocity. Based on the determined control amount, the panning shot control unit 2122 determines whether or not there is a margin for the shake correction amount, in other words, whether or not there is capacity for correcting the image blur of the object in step S1218. If a predetermined control amount necessary for correcting the image blur of the object cannot be secured, the panning shot control unit 2122 determines that there is no capacity for correcting the image blur of the object, and the process proceeds to step S1211. If a predetermined control amount necessary for correcting the image blur of the object can be secured, the panning shot control unit 2122 determines that there is capacity for correcting the image blur of the object, and the process proceeds to step S1210. By the determination processing in this step, the margin for the correction amount of the object shake in step S1218 is secured. However, the determination processing in step S1209 may be omitted.

(S1210) Drive 1 of Shake Correction Optical System

The driver 2113 drives the shift lens group 2104 in accordance with the control amount determined in step S1209. Thus, the image blur of the gaze region is corrected. Subsequently, the process proceeds to step S1211. Steps S1211 to S1216 are the same as steps S910 to S915 in FIG. 9B. In the present embodiment, at the time of step S1211, although focus control is executed, it may be started simultaneously with the process of step S1204 or the like. In step S1212, the motion vector detection frame 702 shown in FIG. 14 is set in addition to the acquisition of the distance information.

(S1217) Calculation of Object Angular Velocity

The object angular velocity calculation unit 2162 calculates an object angular velocity by using the information acquired in steps S1212 to S1215. The details of the calculation processing of the object angular velocity will be described below with reference to FIG. 13.

(S1218) Driving 2 of Shake Correction Optical System

The panning shot control unit 2122 of the lens controller 2112 receives the object angular velocity calculated in step S1217 from the camera controller 2143, and determines a control amount for driving the shift lens group 2104 in exposure time-period. The driver 2113 drives the shift lens group 2104 in accordance with the determined control amount. Thus, after the focus control (S1211), the image blur of the object is corrected. Subsequently, the process ends.

Figure 13:
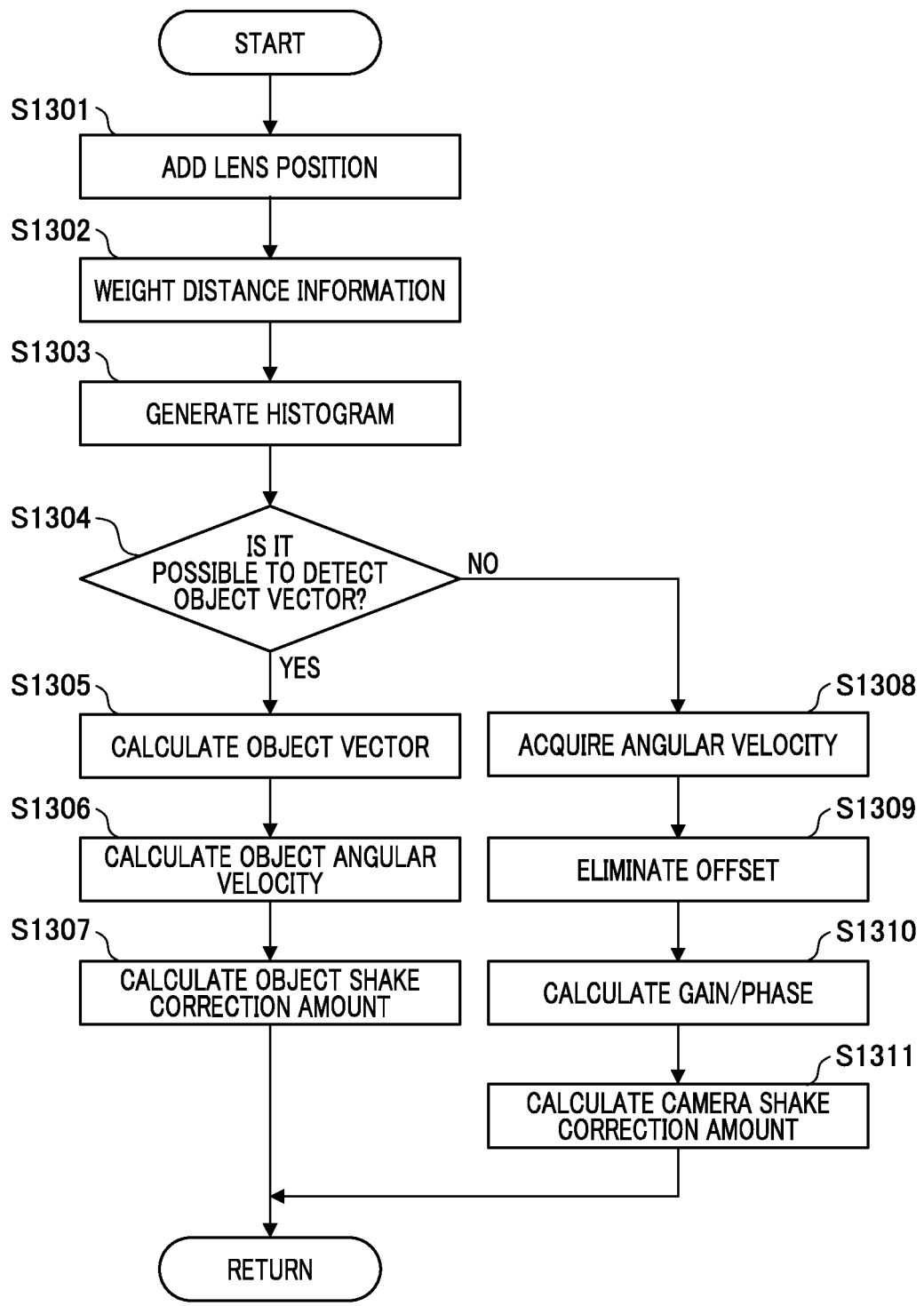
FIG. 13 illustrates the calculation processing for a gaze frame angular velocity and an object angular velocity.

FIG. 13 is a flowchart that illustrates the calculation processing of the angular velocity of the gaze frame in step S1208 of FIG. 12A and the calculation processing of the angular velocity of the object in step S1217 of FIG. 12B. "S" in FIG. 13 denotes a step number corresponding to each process in the flowchart. In the description of the process of step S1208 in this flowchart, "object" is replaced with "gaze frame".

(S1301) Addition of Lens Position

The camera controller 2143 executes a process of adding the value of the position information of the shift lens group 2104 acquired in step S1204 or S1213 of FIGS. 12A and 12B to the detection value of the motion vector detection unit 2151. Accordingly, even if the shift lens group 2104 is driven by the camera shake correction control during detection of the motion vector, an image regarding the object shake can be obtained. Subsequently, the process proceeds to step S1302.

(S1302) Weighting of Distance Information

The camera signal processing circuit 2135 weights the distance information corresponding to each detection block in the detection frame 704 or the detection frame 702 of FIG. 14 based on the distance information acquired in step S1205 or S1212 of FIGS. 12A and 12B. If the distance information in the screen could not be acquired, this process is omitted. Subsequently, the process proceeds to step S1012.

(S1303) Generation of Histogram

The camera controller 2143 performs histogram calculation regarding the motion vector based on the motion vector acquired in step S1205 or S1214 of FIGS. 12A and 12B. After generating the histogram, the process proceeds to step S1304.

(S1304) Determination Whether or not to Detect Object Vector Candidate

The camera controller 2143 determines whether or not an object vector candidate could be detected based on the generated histogram. If the object vector candidate could be detected, the process proceeds to step S1305. If the object vector candidate could be detected, the process proceeds to step S1308.

(S1305) Calculation of Object Vector

The camera controller 2143 selects an object vector to be finally used from among object vector candidates. For example, if an object vector has been detected in the closest detection block to the position of the focus frame (not illustrated in FIG. 14) and the distance information has been acquired, the vector detected in the closest detection block is selected as an object vector. Note that the closest detection block is used as a start point, and the object vector around the closest detection block may be integrated. After the object vector is calculated, the process proceeds to step S1306.

(S1306) Calculation of Object Angular Velocity

The object angular velocity calculation unit 2162 calculates an object angular velocity based on the image plane movement amount of the object corresponding to the object vector calculated in step S1305. The object angular velocity calculation unit 2162 calculates an object angular velocity by using a method opposite to the method for calculating the image plane movement amount based on the angular velocity in step S1207 or S1216 of FIGS. 12A and 12B. Subsequently, the process proceeds to step S1307.

(S1307) Calculation of Object Shake Correction Amount

The camera controller 2143 adds the value of the angular velocity transmitted from the angular velocity output unit 622 to the camera controller 2143 to the calculated object angular velocity, and transmits the result to the lens controller 2112. The object angular velocity acquisition unit 623 acquires the object angular velocity transmitted from the camera controller 2143 to the lens controller 2112, and outputs the acquired object angular velocity to the subtractor 624. The subtractor 624 calculates a difference between the angular velocity detected by the angular velocity sensor 2111 in the interchangeable lens 1A and the object angular velocity. The integrator 625 integrates the calculated difference, and outputs the integrated value to the control determination unit 604 to serve as a target control value of the shake correction optical system (object shake correction amount) for correcting image blur. Subsequently, the process shifts to the return processing. Steps S1308 to S1311 are the same as steps S1017 to S1020 in FIG. 10. According to the image processing apparatus of the second embodiment, it is possible to correct image blur of the gaze region while capacity for correcting the image blur of the object remains.

Third Embodiment

Figure 15A:
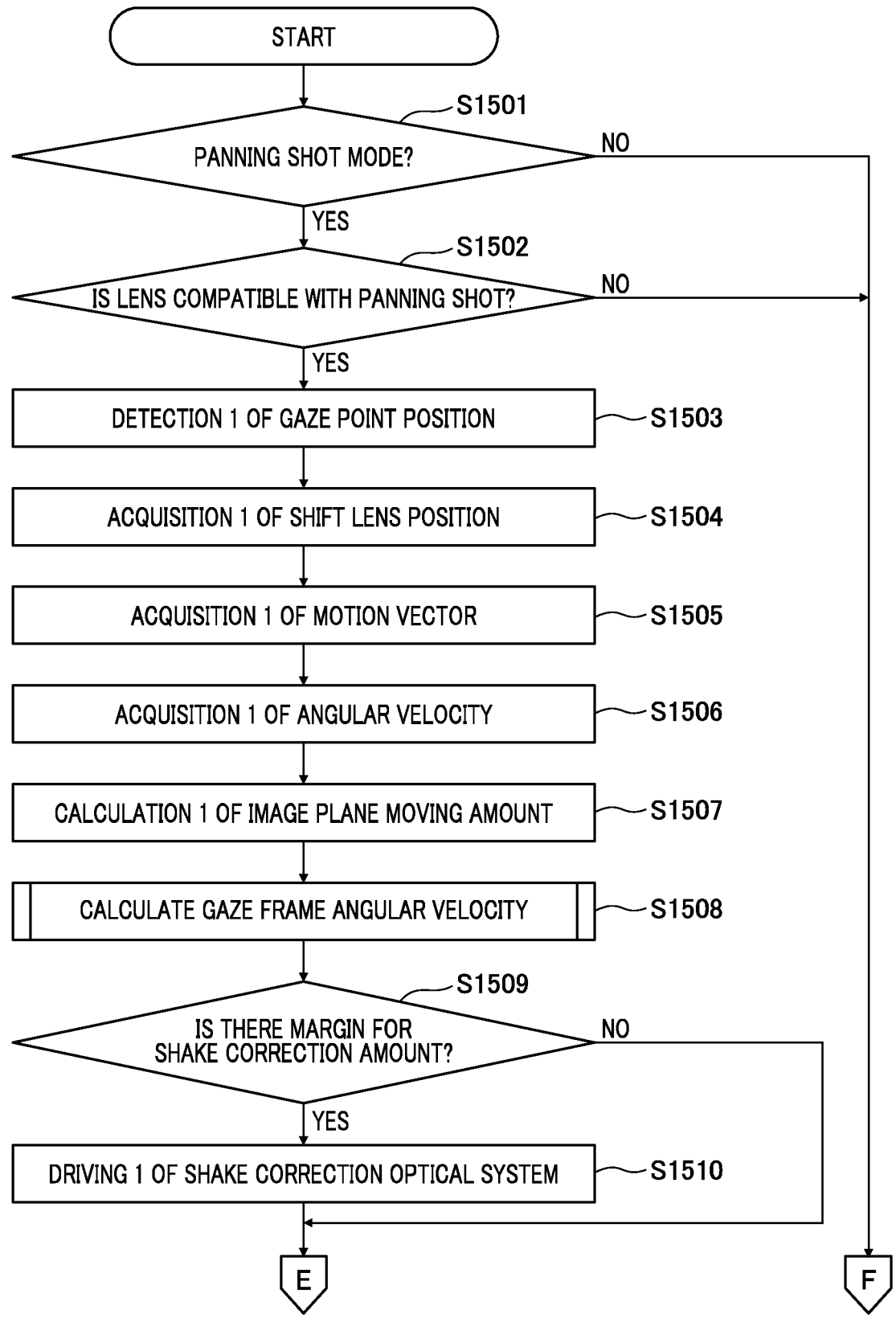
FIGS. 15A and 15B are flowcharts illustrating the panning shot assisting control.
Figure 15B:
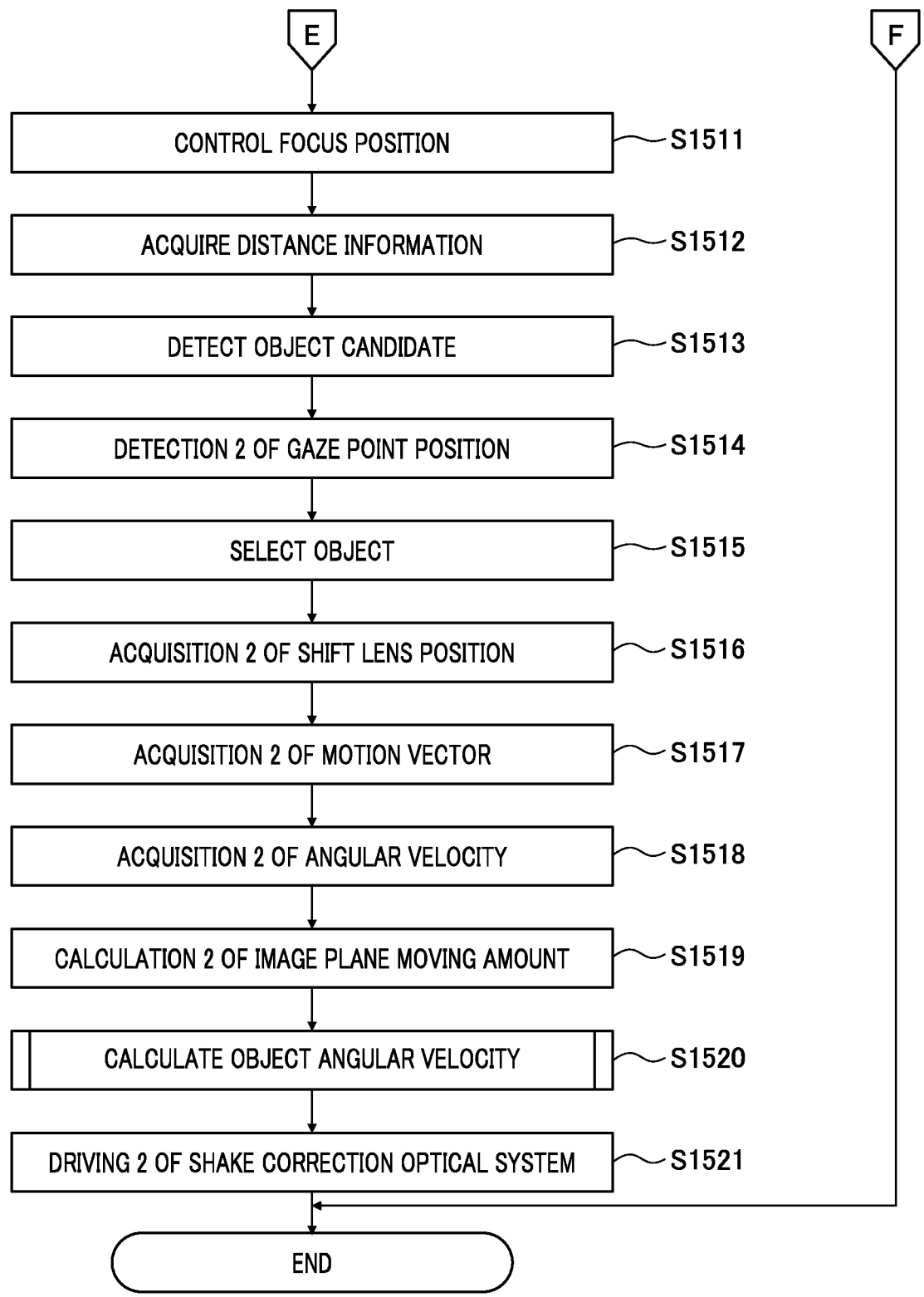

FIGS. 15A and 15B are flowcharts that illustrates panning shot assisting control in the third embodiment. The configuration of the digital camera 100 in the third embodiment is similar to that of the digital camera in the first or second embodiment. The following process is realized when the camera controller 2143, the camera signal processing circuit 2135, and the lens controller 2112 interpret and execute a predetermined control program. "S" in FIGS. 15A and 15B denotes a step number corresponding to each process in the flowchart. The third embodiment will be described below with a focus on a difference from the second embodiment. Since steps S1501 to S1512 in FIGS. 15A and 15B are the same as steps S1201 to S1212 in FIGS. 12A and 12B, the description thereof will be omitted.

(S1513) Detection of Object Candidate

Figure 16A:
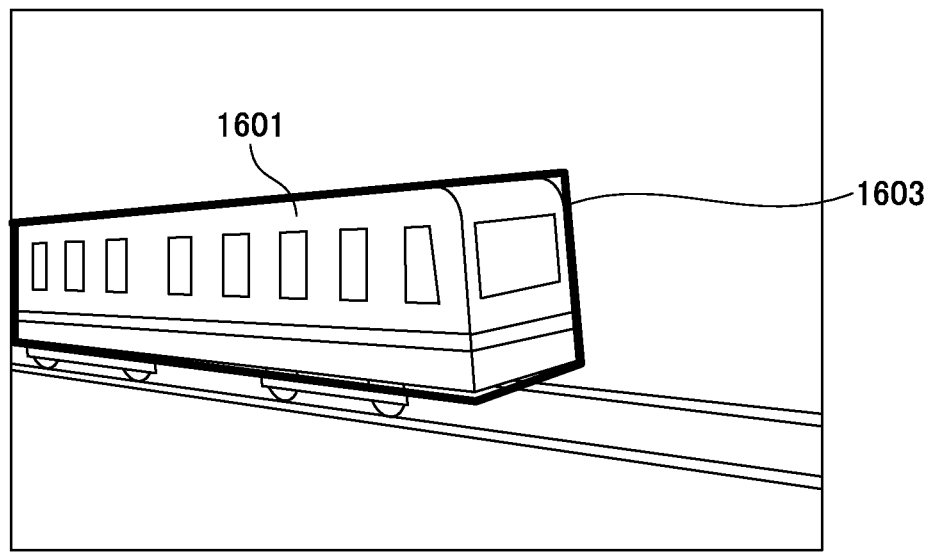
FIGS. 16A and 16B illustrate the detection of object candidates and the setting of a motion vector detection frame.

The camera signal processing circuit 2135 detects an object candidate based on the distance information acquired in step S1512. FIG. 16A to FIG. 17B illustrate the detection of an object candidate and setting of a motion vector detection frame. For example, as shown in FIG. 16A, the camera signal processing circuit 2135 determines an object candidate 1601 based on the distance information, and detects a peripheral region of the object candidate 1601 as a region for an object candidate (object candidate region) 1603. For example, as shown in FIG. 17A, the camera signal processing circuit 2135 also determines a plurality of object candidates 1701 to 1703 based on the distance information, and detects the peripheral region of each object candidate as object candidate regions 1711 to 1713. Subsequently, the process proceeds to step S1514.

(S1514) Detection 2 of Gaze Point Position

The camera signal processing circuit 2135 detects a gaze point position at which the user gazes by the process described with reference to FIG. 5. Subsequently, the camera signal processing circuit 2135 sets a gaze frame indicating a region that includes the detected gaze point position (gaze region).

(S1515) Selection of Object Region

The camera signal processing circuit 2135 selects an object region based on the object candidate region detected in step S1513 and the gaze frame set in step S1514, and disposes a detection frame for the motion vector based on the object region.

Figure 16B:
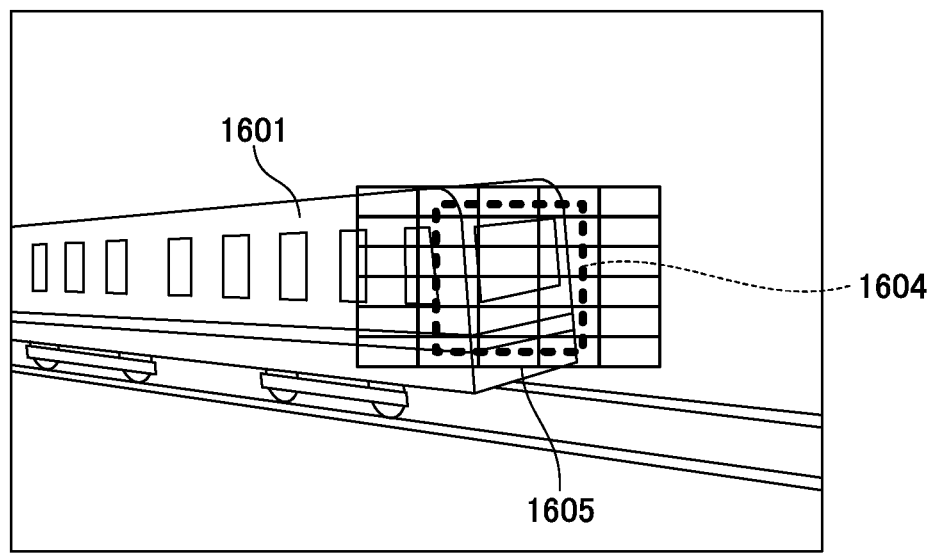
Figure 17A:
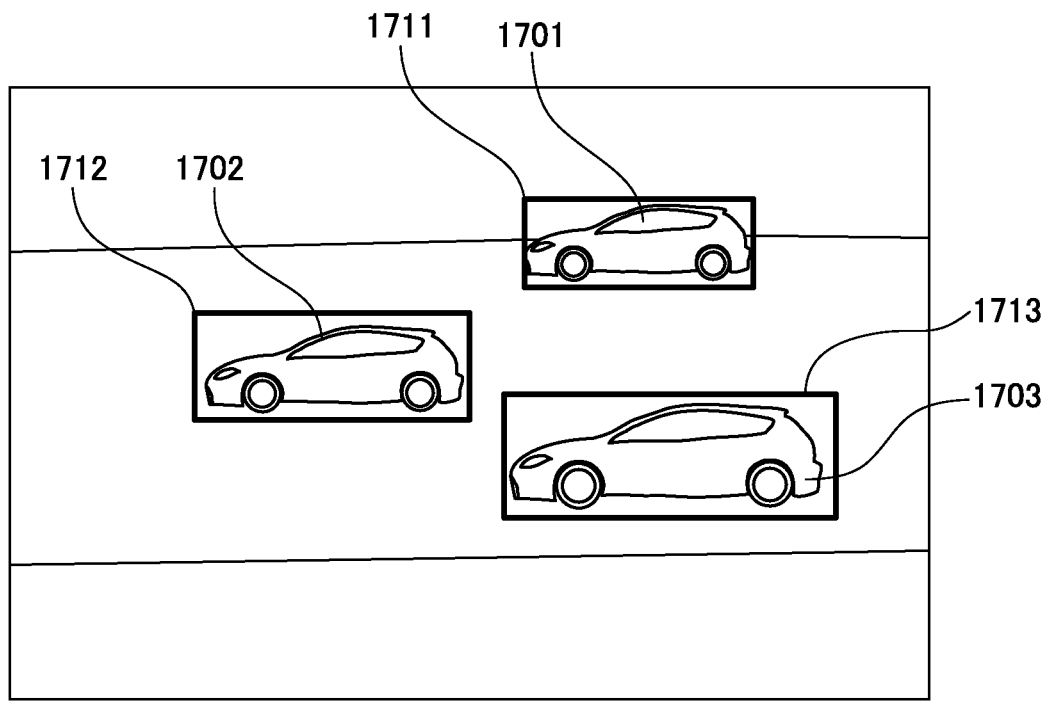
FIGS. 17A and 17B illustrate the detection of object candidates and the setting of a motion vector detection frame.
Figure 17B:
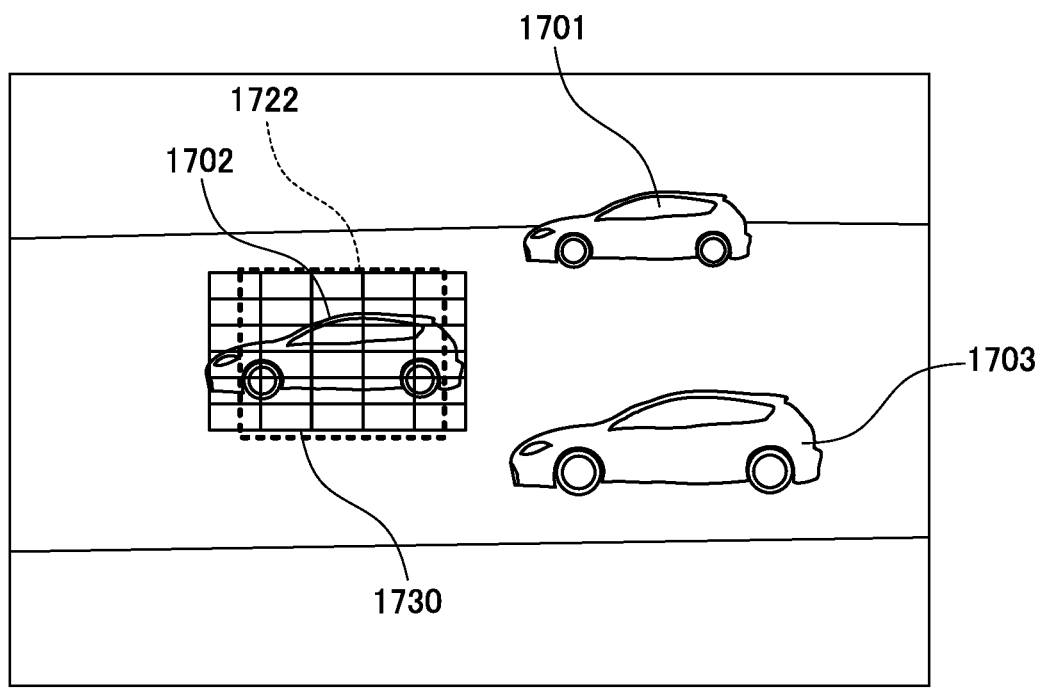

FIG. 16B and FIG. 17B illustrate a gaze frame including a gaze point position and a detection frame for detecting a motion vector in step S1517. It is assumed that the object candidate region is larger than the region in the gaze frame (gaze region). For example, as shown in FIG. 16B, the camera signal processing circuit 2135 detects a region within a gaze frame 1604 as an object region. Subsequently, the camera signal processing circuit 2135 disposes a motion vector detection frame 1605 in a predetermined region including the detected object region. Since the right end portion and the left end portion of the object candidate 1601 have different moving speeds within an angle of view for shooting, image blur correction control can be accurately performed by limiting the region within the gaze frame 1604 as an object region. If the object candidate region is smaller than the region within the gaze frame, the camera signal processing circuit 2135 may dispose a motion vector detection frame in a predetermined region including the object candidate region.

Additionally, for example, as shown in FIG. 17B, the camera signal processing circuit 2135 detects a region of the object candidate 1702 that overlaps with the gaze frame 1722 from among a plurality of object candidates 1711 to 1713 to serve as an object region. The camera signal processing circuit 2135 disposes a detection frame 1730 for a motion vector in a predetermined region including the detected object region. Since the process of steps S1516 to S1521 is the same as that in steps S1213 to S1218 in FIG. 12B, the description thereof will be omitted. According to the image processing apparatus of the third embodiment, even if the object candidate region is large and there is a difference in a moving speed depending on the location of the object candidate region or if a plurality of object candidate regions is detected due to the large size of the object candidate region, a motion vector corresponding to the object region can be detected by using the gaze frame.

Fourth Embodiment

Figure 18A:
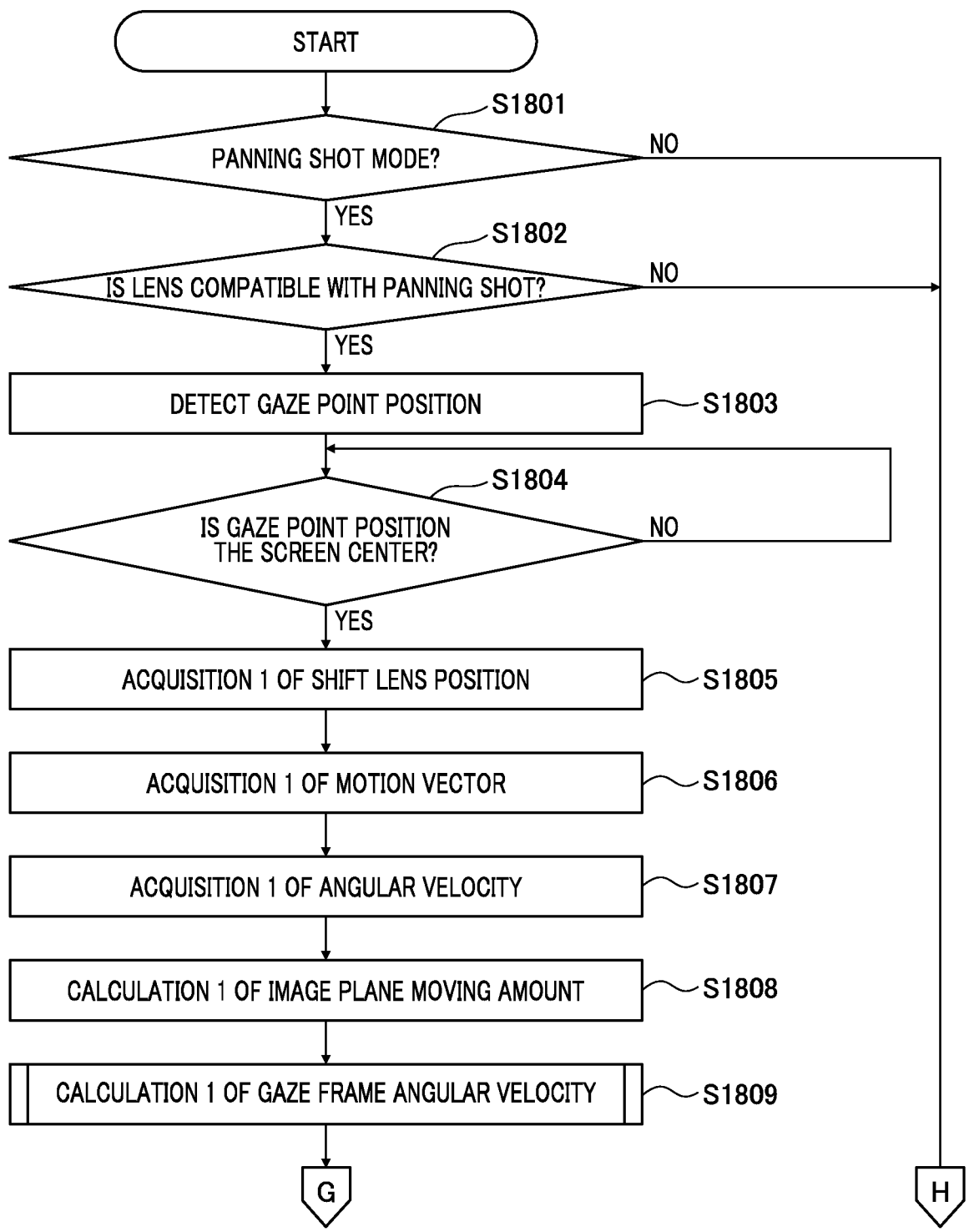
FIGS. 18A and 18B are flowcharts illustrating the panning shot assisting control.
Figure 18B:
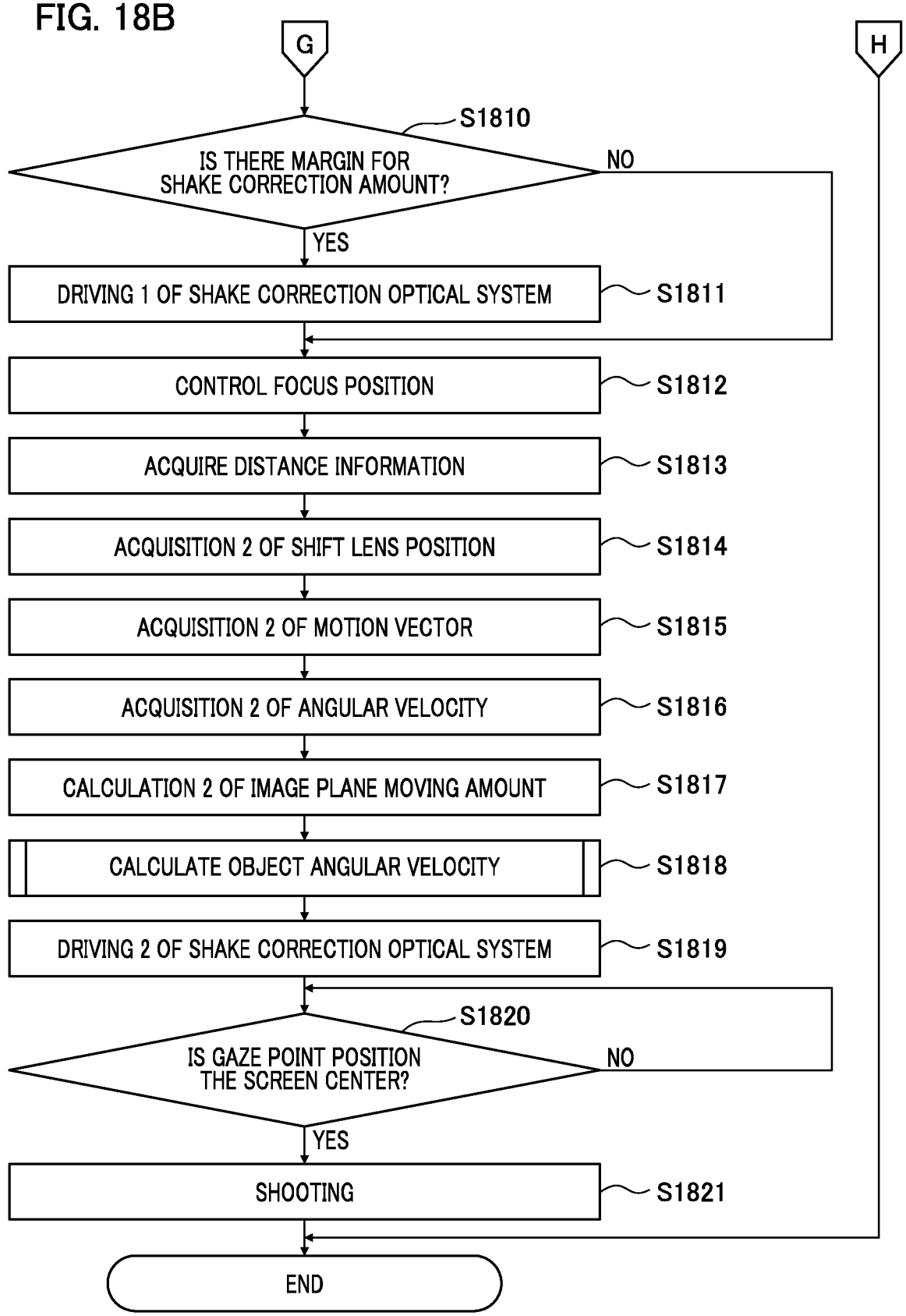

FIGS. 18A and 18B are flowcharts that illustrates the panning shot assisting control in the fourth embodiment. The configuration of the digital camera 100 in the fourth embodiment is the same as that of the digital camera 100 in the first, second, or third embodiment. The following process is realized when the camera controller 2143, the camera signal processing circuit 2135, and the lens controller 2112 interpret and execute a predetermined control program. "S" in FIGS. 18A and 18B denotes a step number corresponding to each process in the flowchart. The fourth embodiment will be described below with a focus on a difference from the second embodiment. Steps S1801 to S1803 in FIG. 18A are the same as steps S1201 to S1203 in FIG. 12A.

(S1804) Determination of Gaze Point Position

The camera signal processing circuit 2135 determines whether or not the position of the gaze frame set in step S1803 is a predetermined position for the angle of view for shooting. In this example, the camera signal processing circuit 2135 determines whether or not the position of the gaze frame is the center of the angle of view. If the position of the gaze frame is not a predetermined position (for example, the center of the angle of view), the process returns to step S1804. If the position of the gaze frame is a predetermined position, the process proceeds to step S1805. The predetermined position is variable depending on the position at which the object is stopped to obtain the composition.

Figure 19:
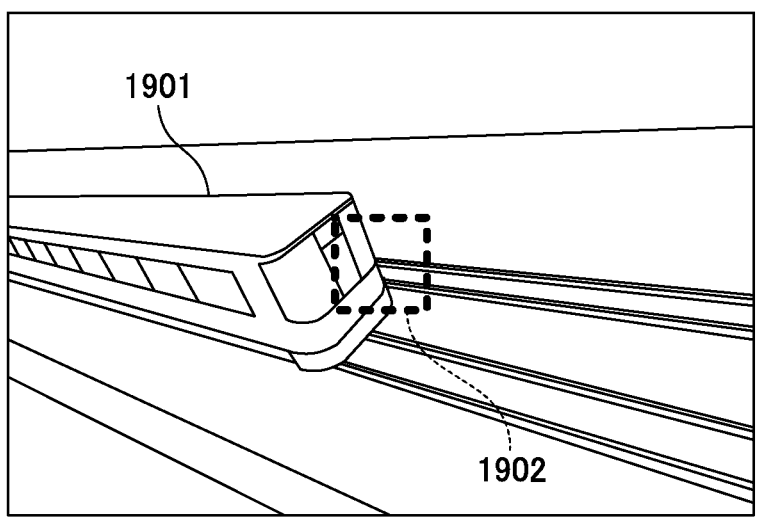
FIG. 19 illustrates an object during a panning shot.

FIG. 19 illustrates an object 1901 during panning shot. In the example shown in FIG. 19, a gaze frame 1902 is located at the center of the screen. Accordingly, the process proceeds to step S1805 in FIG. 18A. Since the process in steps S1805 to S1818 is the same as that in steps S1204 to S1218 in FIGS. 12A and 12B, the description thereof will be omitted.

(S1819) Determination of Gaze Point Position

Similar to step S1804, the camera signal processing circuit 2135 determines whether or not the position of the gaze frame is a predetermined position of the angle of view for shooting. In this example, the camera signal processing circuit 2135 determines whether or not the position of the gaze frame is the center of the angle of view. If the position of the gaze frame is not a predetermined position (for example, the center of the angle of view), the process returns to step S1819. If the position of the gaze frame is a predetermined position, the process proceeds to step S1820. Note that the predetermined position is variable depending on the position at which the object is stopped to obtain the composition.

(S1820) Shooting

The camera controller 2143 and the camera signal processing circuit 2135 function as a shooting control means, and perform shooting an object at an angle of view in which a gaze frame is at a predetermined position (for example, the center of the angle of view). In the determination processing in step S1801, although the camera controller 2143 determines whether or not the panning shot mode has been set, the following process may be performed instead of this determination processing. Specifically, the camera controller 2143 determines that the panning shot will be performed when an operation for changing the shooting direction of the digital camera 100 (for example, panning) is performed and the user is gazing at the object. Subsequently, the process proceeds to step S1802. For example, when the gaze point position overlaps with the object candidate region, the camera controller 2143 determines that the user is gazing at the object. The camera controller 2143 may determine that the user is gazing at the object when a gaze time corresponding to the gaze point position that overlaps with the object candidate region is a predetermined time or longer.

Additionally, in place of the determination processing in step S1801, the camera controller 2143 may determine whether or not the panning shot will be performed by using machine learning, and if it is determined that the panning shot will be performed, the process may proceed to the process following step S1802. Accordingly, the drive of the shake correction optical system in steps S1811 and S1818 is executed in accordance with the determination result of the panning shot by using a machine learning. For this purpose, for example, the recording medium 111 stores a learning model created by the machine learning based on the user's line-of-sight information during a panning shot. Subsequently, the camera controller 2143 inputs the user's line-of-sight information to the learning model in the recording medium 111 and determines whether or not the panning shot will be performed by using the learning model. The learning model may be stored in a server on a cloud that can communicate with the digital camera 100 through a network. The camera controller 2143 transmits the user's line-of-sight information to the server and the server inputs the user's line-of-sight information to the learning model and determines whether or not panning shot will be performed. Subsequently, the camera controller 2143 may determine whether or not the panning shot will be performed based on the determination result received from the server.

According to the image processing apparatus of the fourth embodiment, a timing for starting image blur correction and shooting can be automatically controlled in accordance with a position where the user wants to stop the object. Accordingly, the success rate of shooting can be increased in a time-period of a short shutter opportunity. The present invention is not limited to the first to fourth embodiments described above. Additionally, each embodiment may be combined appropriately.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-169625, filed Sep. 18, 2019, which is hereby incorporated by reference wherein in its entirety.

What is claimed is:

1. An image processing apparatus comprising:
   at least one processor and memory holding a program that makes the processor function as:
   a correction control unit configured to correct an image blur of a captured image by driving a correction unit;
   a determination unit configured to determine a specified region of the captured image; and
   a focus control unit configured to execute focus control to focus on an object,
   wherein if a panning shot will be performed, the focus control unit executes the focus control after the correction control unit drives the correction unit based on a movement of the specified region to execute a first correction control in which an image blur of the specified region is corrected.

2. The image processing apparatus according to claim 1, wherein the specified region is a gaze region at which a user gazes.

3. The image processing apparatus according to claim 2, wherein the determination unit determines the gaze region based on line-of-sight information of the user.

4. The image processing apparatus according to claim 1, wherein the processor further functions as:
   an acquisition unit configured to acquire a motion vector based on the captured image,
   wherein after the focus control unit executes the focus control, the correction control unit drives the correction unit based on the motion vector acquired by the acquisition unit to execute a second correction control in which an image blur of an object is corrected.

5. The image processing apparatus according to claim 4, wherein the correction control unit executes the first correction control if there is capacity for correcting the image blur executed by the second correction control.

6. The image processing apparatus according to claim 4, wherein the acquisition unit determines a region in which a motion vector to be used to execute the second correction control is acquired based on the specified region determined by the determination unit.

7. The image processing apparatus according to claim 6, wherein the acquisition unit determines a region of an object candidate based on distance information indicating a distance in the depth direction to an object included in the captured image, and if the region of the object candidate is larger than the specified region, the acquisition unit determines a predetermined region including the specified region as a region in which the motion vector to be used to execute the second correction control is acquired.

8. The image processing apparatus according to claim 6, wherein, if there is a plurality of regions for the object candidate, the acquisition unit determines a predetermined region including the region of the object candidate that overlaps with the specified region as a region in which the motion vector to be used to execute the second correction control is acquired.

9. The image processing apparatus according to claim 1, wherein the correction control unit executes the first correction control if the determined specified region is at a predetermined position at an angle of view for shooting.

10. The image processing apparatus according to claim 4, wherein the correction control unit drives the correction unit to execute the first correction control and the second correction control if a panning shot mode is set.

11. The image processing apparatus according to claim 4, wherein, if an operation of changing a shooting direction of an imaging apparatus that acquires the captured image has been performed and the user is gazing at an object, the correction control unit determines that the panning shot will be performed and executes the first correction control and the second correction control performed by the driving of the correction unit.

12. The image processing apparatus according to claim 4, wherein a learning model created by machine learning based on the information regarding user's line-of-sight during a panning shot is stored in the memory, and
wherein the correction control unit executes the first correction control and the second correction control performed by the driving of the correction unit in accordance with a determination result for whether or not the panning shot will be performed based on the learning model in which the line-of-sight information of the user is input.

13. An imaging apparatus comprising:
   an imaging element configured to photoelectrically convert object light and output a signal of a captured image;
   at least one processor and memory holding a program which makes the processor function as:
   a correction control unit configured to correct an image blur of a captured image by driving a correction unit;
   a determination unit configured to determine a specified region of the captured image; and
   a focus control unit configured to execute focus control to focus on an object,
   wherein if a panning shot will be performed, the focus control unit executes the focus control after the correction control unit drives the correction unit based on a movement of the specified region to execute a first correction control in which an image blur of the specified region is corrected.

14. The imaging apparatus according to claim 13, wherein the processor further function as a shooting control unit configured to execute control to shoot an object if the determined specified region is at a predetermined position at an angle of view for shooting.

15. A control method of an image processing apparatus having a correction unit for correcting an image blur of a captured image comprising:

determining a specified region of the captured image; and executing focus control to focus on an object, wherein if a panning shot will be performed, the focus control is executed in the executing focus control after an image blur for the specified region is corrected by the driving of the correction unit based on a movement of the specified region.

* * * * *